(12) United States Patent
Kouznetsov et al.

(10) Patent No.: US 7,549,062 B2
(45) Date of Patent: *Jun. 16, 2009

(54) ORGANIZATION-BASED CONTENT RIGHTS MANAGEMENT AND SYSTEMS, STRUCTURES, AND METHODS THEREFOR

(75) Inventors: Pavel Kouznetsov, Sammamish, WA (US); Jason Cahill, Carnation, WA (US); David Ornstein, Seattle, WA (US); Lauren Antonoff, Seattle, WA (US); Mark Walker, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 788 days.

This patent is subject to a terminal disclaimer.

(21) Appl. No.: 10/607,627

(22) Filed: Jun. 27, 2003

(65) Prior Publication Data

US 2004/0268137 A1 Dec. 30, 2004

(51) Int. Cl.
*H04L 9/32* (2006.01)
*H04L 9/00* (2006.01)
(52) U.S. Cl. .................... 713/193; 705/57
(58) Field of Classification Search .......... None
See application file for complete search history.

(56) References Cited

U.S. PATENT DOCUMENTS

| | | |
|---|---|---|
| 5,335,346 A | 8/1994 | Fabbio |
| 5,715,403 A | 2/1998 | Stefik ............... 395/244 |
| 5,758,069 A | 5/1998 | Olsen |
| 5,761,669 A | 6/1998 | Montague et al. |
| 5,781,901 A | 7/1998 | Kuzma |
| 5,864,620 A | 1/1999 | Pettitt |
| 5,903,723 A | 5/1999 | Beck et al. |
| 5,991,876 A | 11/1999 | Johnson et al. |
| 6,006,332 A | 12/1999 | Rabne et al. |
| 6,189,146 B1 | 2/2001 | Misra et al. |

(Continued)

FOREIGN PATENT DOCUMENTS

WO     WO 00/58811     10/2000

(Continued)

OTHER PUBLICATIONS

Hong, S. et al., "On the construction of a powerful distributed authentication server without additional key management", *Computer Communications*, 2000, 23, 1638-1644.

(Continued)

*Primary Examiner*—Brandon S Hoffman
(74) *Attorney, Agent, or Firm*—Woodcock Washburn LLP

(57) ABSTRACT

A rights-managed document has protected content from an author thereof, whereby a recipient of the document can render the protected content with a corresponding license if the recipient satisfies terms set forth in the license. In the document, a storage portion has a message that the document is rights management protected, and a custom data portion has a section including the protected content. The recipient if enabled can render the protected content in the custom data portion and if not enabled can only review the storage portion having the message. An enabled recipient handles the received rights-managed document by recognizing that the document has the protected content in the custom data portion thereof, and discounting the storage portion of the document. Thus, the recipient examines the custom data portion of the document and proceeds based thereon to render the protected content in the custom data portion.

20 Claims, 17 Drawing Sheets

U.S. PATENT DOCUMENTS

| | | | |
|---|---|---|---|
| 6,219,652 | B1 | 4/2001 | Carter et al. |
| 6,226,618 | B1 | 5/2001 | Downs et al. |
| 6,260,141 | B1 | 7/2001 | Park |
| 6,389,535 | B1 | 5/2002 | Thomlinson et al. |
| 6,446,207 | B1 | 9/2002 | Vanstone et al. |
| 6,557,105 | B1 | 4/2003 | Frailong et al. |
| 6,571,337 | B1 | 5/2003 | Xiao |
| 6,574,611 | B1 | 6/2003 | Matsuyama et al. |
| 6,584,564 | B2 | 6/2003 | Olkin et al. |
| 6,601,102 | B2 | 7/2003 | Eldridge et al. |
| 6,701,433 | B1 | 3/2004 | Schell et al. |
| 6,714,921 | B2 | 3/2004 | Stefik et al. |
| 6,792,537 | B1 | 9/2004 | Liu et al. |
| 6,801,998 | B1 | 10/2004 | Hanna et al. |
| 6,807,542 | B2 | 10/2004 | Bantz et al. |
| 6,826,596 | B1 | 11/2004 | Suzuki |
| 6,856,686 | B2 * | 2/2005 | DiSanto et al. ............. 380/243 |
| 6,859,790 | B1 | 2/2005 | Nonaka et al. |
| 6,873,975 | B1 | 3/2005 | Hatakeyama et al. |
| 6,889,246 | B1 | 5/2005 | Kawamoto et al. |
| 6,895,503 | B2 | 5/2005 | Tadayon et al. |
| 6,961,858 | B2 | 11/2005 | Fransdonk |
| 6,973,444 | B1 | 12/2005 | Blinn et al. |
| 6,976,009 | B2 | 12/2005 | Tadayon et al. |
| 6,983,371 | B1 | 1/2006 | Hurtado et al. |
| 7,017,188 | B1 | 3/2006 | Schmeidler et al. |
| 7,020,781 | B1 | 3/2006 | Saw et al. |
| 7,024,393 | B1 | 4/2006 | Peinado et al. |
| 7,035,827 | B2 | 4/2006 | Ezaki |
| 7,036,011 | B2 | 4/2006 | Grimes et al. |
| 7,058,819 | B2 | 6/2006 | Okaue |
| 7,085,741 | B2 | 8/2006 | Lao et al. |
| 7,103,574 | B1 * | 9/2006 | Peinado et al. ................ 705/51 |
| 7,120,606 | B1 * | 10/2006 | Ranzini et al. ................ 705/64 |
| 7,213,005 | B2 | 5/2007 | Mourad et al. |
| 7,228,437 | B2 | 6/2007 | Spagna et al. |
| 2001/0010076 | A1 | 7/2001 | Wray |
| 2001/0053223 | A1 | 12/2001 | Ishibashi et al. |
| 2002/0013772 | A1 | 1/2002 | Peinado |
| 2002/0065781 | A1 | 5/2002 | Hillegass et al. |
| 2002/0077985 | A1 | 6/2002 | Kobata et al. |
| 2002/0107806 | A1 | 8/2002 | Higashi et al. |
| 2002/0112171 | A1 | 8/2002 | Ginter et al. |
| 2002/0118835 | A1 | 8/2002 | Uemura |
| 2002/0144131 | A1 | 10/2002 | Spacey |
| 2002/0184515 | A1 | 12/2002 | Oho et al. |
| 2002/0198845 | A1 | 12/2002 | Lao et al. |
| 2002/0198846 | A1 | 12/2002 | Lao |
| 2003/0013772 | A1 | 1/2003 | Murphy et al. |
| 2003/0028454 | A1 | 2/2003 | Ooho et al. |
| 2003/0028490 | A1 | 2/2003 | Miura et al. |
| 2003/0046238 | A1 | 3/2003 | Nonaka et al. |
| 2003/0167392 | A1 | 9/2003 | Fransdonk |
| 2003/0236820 | A1 | 12/2003 | Tierney et al. |
| 2004/0001594 | A1 | 1/2004 | Krishnaswamy et al. |
| 2004/0003269 | A1 | 1/2004 | Waxman et al. |
| 2004/0003270 | A1 | 1/2004 | Bourne et al. |
| 2004/0039916 | A1 | 2/2004 | Aldis et al. |
| 2004/0054678 | A1 | 3/2004 | Okamoto et al. |
| 2004/0088541 | A1 | 5/2004 | Messerges et al. |
| 2004/0193919 | A1 | 9/2004 | Dabbish et al. |
| 2004/0249756 | A1 | 12/2004 | Garibay et al. |
| 2005/0289076 | A1 | 12/2005 | Lambert |
| 2006/0168451 | A1 | 7/2006 | Ishibashi et al. |

FOREIGN PATENT DOCUMENTS

| | | |
|---|---|---|
| WO | WO 00/59150 | 10/2000 |
| WO | WO 00/68763 | 11/2000 |
| WO | WO 01/52021 A1 | 7/2001 |
| WO | WO 02/01335 A2 | 1/2002 |
| WO | WO 02/23315 A2 | 3/2002 |
| WO | WO 02/37371 A1 | 5/2002 |

OTHER PUBLICATIONS

Managing Digital Rights in Online Publishing, "How two publishing houses maintin control of copyright" *Information Management & Technology*, 2001, 34(4), 168-169.

Jakobsson, M. et al., "Proprietary Certificates", *Topics in Cryptology*, 2002, 164-181.

Kumik, P. "Digital Rights Management", *Computers and Law*, 2000, 11(4), 14-15.

Torrubia, A. et al., "Cryptography regulations for E-commerce and digital rights management", *Computers & Security*, 2001, 20(8), 724-738.

Zwollo, K. "Digital document delivery and digital rights management", *Information Services & Use*, 2001, 9-11.

Griswold, G.N. "A Method for Protecting Copyright on Networks", *IMA Intellectual Property Project Proceedings*, 1994, 1(1), 169-178.

Kahn, R.E. "Deposit, Registration and Recordation in an Electronic Copyright Management System", *IMA Intellectual Property Project Proceedings*, 1994, 1(1), 111-120.

Evans, P. "DRM: Is the Road to Adoption Fraught with Potholes?" *Seybold Reporting Analyzing Publishing Technologies*, 2001, 1(14), 32.

Fowler, T.B. "Technology's Changing Role in Intellectual Property Rights", *IT Professional(IEEE)*, 2002, 4(2), 39-44.

Gable, J. "The Digital Rights Conundrum", *Transform Magazine*, 2001, 10(11), 27.

Gunter, C.A., et al. "Models and Languages for Digital Rights", *Proceedings of the 34th Annual Hawaii International Conference on System Sciences*, 2001, 1-5.

Peinado, M. "Digital rights management in a multimedia environment", *SMPTE Journal*, 2002, 111(3), 159-163.

Royan, B. Content creation and rights managements; experiences of SCRAN(the Scottish Culture Resources Access Network), *Program*, 2000, 34(2), 131-142.

Valimaki, M. et al., "Digital rights management on open and semi-open networks", *WIAPP*, 2001, 154-155.

Yu, H. "Digital multimedia at home and content rights management", *IEEE, Proceedigns 2002 IEEE 4th International Workshop on Networked Appliances*, 2002, 49-56.

Hwang, C. et al., "Protection of Digital Contents on Distributed Multimedia Environment", *Proceedings of the IASTED International Conference, Internet and Mutimedia Systems and Applications*, Nov. 19-23, 2000, Las Vegas, Nevada, USA, pp. 127-132.

Free On-Line Dictionary of Computing, Concatenate, 1995, 1 page.

Kaplan, M.A., "IBM Cryptolopes™, SuperDistribution and Digital Rights Management", http://www.Research.ibm.com, 1996, 1-7.

Menezes, et al. Handbook of Applied Crytography, 1997, CRC Press, 31-32.

Schneier, B., "Applied Cryptography Passage", *Applied Crytography, Protocols, Algorithms and Source Code in C*, 1996, 2nd Edition, 585-587, XP 000863833.

Schneier, B., "Applied Cryptography", *Applied Crytography, Protocols, Algorithms and Source Code in C*, 1996, 2nd Edition, 183-187, XP 002954321.

Schneier, B., "Applied Cryptography", *Applied Crytography, Protocols, Algorithms and Source Code in C*, 1996, 2nd Edition, 574-577, XP 002922914.

UCSB College of Engineering-Press Release, One Company Sold, Second Company to go Public . . . www.engineering.ucsb.edu, Dec. 8, 2001.

UCSB College of Engineering-Press Release, Research breakthrough for Fiber Optic Communications . . . www.engineering.ucsb.edu, Dec. 8, 2001.

* cited by examiner

| EMAIL 44 |
|---|
| MAIN INFO 48
- MESSAGE |
| ATTACHMENT 46
- [COMPRESSED] PROTECTED CONTENT 32
- - (KD(CONTENT))
- - - BODY INFO
- - - BODY IN PLAIN TEXT
- - - BODY IN HTML
- - - BODY IN RTF
- - - ATTACHMENTS
- - - - INFO
- - - - ATTACHMENT 52
- - - - ATTACHMENT 52
- - - METADATA
- RIGHTS DATA 50
- - RIGHTS
- - (PU-RM(KD)) OR (PU-SE(KD))
- - SIGNATURE |

Fig. 4

```
┌─────────────────────────────────────────────────┐
│                  DOCUMENT 62                    │
├─────────────────────────────────────────────────┤
│              DOCUMENT PROPERTIES                │
├─────────────────────────────────────────────────┤
│               CUSTOM PROPERTIES                 │
├─────────────────────────────────────────────────┤
│                   STORAGE 68                    │
│ - MESSAGE                                       │
├─────────────────────────────────────────────────┤
│                  CUSTOM DATA 66                 │
│ SECTION 64 - [COMPRESSED] PROTECTED CONTENT 32  │
│ - (KD(CONTENT))                                 │
│ -  - CONTENT INFO                               │
│ -  - CONTENT IN PLAIN TEXT                      │
│ -  - CONTENT IN HTML                            │
│ -  - CONTENT IN RTF                             │
│ SECTION 64 - RIGHTS DATA 50                     │
│ - RIGHTS                                        │
│ - (PU-RM(KD)) OR (PU-AU(KD))                    │
│ - SIGNATURE                                     │
│ SECTION 64 - LICENSES 36                        │
│ - LICENSE 36                                    │
│ - LICENSE 36                                    │
│ SECTION 64 - TRANSFORMS 70                      │
│ - RM PART                                       │
│ -  - SECTION 64 WITH ENCRYPTED DATA             │
│ -  - SECTION 64 WITH DECRYPTION KEY (KD)        │
│ - COMPRESSION PART                              │
│ -  - SECTION 64 WITH COMPRESSED DATA            │
│ -  - COMPRESSION MECHANISM                      │
└─────────────────────────────────────────────────┘
```

Fig. 10

ORGANIZATION-BASED CONTENT RIGHTS MANAGEMENT AND SYSTEMS, STRUCTURES, AND METHODS THEREFOR

CROSS-REFERENCE TO RELATED APPLICATIONS

The following U.S. patent applications disclose subject matter that is related to the subject matter of the present application, and are hereby incorporated herein by reference in their entirety:

U.S. patent application Ser. No. 10/607,898, filed concurrently with the present application entitled "Organization-Based Content Rights Management and Systems, Structures, and Methods Therefor";

U.S. patent application Ser. No. 10/608,476, filed concurrently with the present application entitled "Organization-Based Content Rights Management and Systems, Structures, and Methods Therefor";

U.S. patent application Ser. No. 10/607,896, filed concurrently with the present application entitled "Organization-Based Content Rights Management and Systems, Structures, and Methods Therefor";

U.S. patent application Ser. No. 10/185,527, filed Jun. 28, 2002 entitled "Obtaining a Signed Rights Label (SRL) for Digital Content and Obtaining a Digital License Corresponding to the Content Based on the SRL in a Digital Rights Management System";

U.S. patent application Ser. No. 10/185,278, filed Jun. 28, 2002 entitled "Using a Rights Template to Obtain a Signed Rights Label (SRL) for Digital Content in a Digital Rights Management System";

U.S. patent application Ser. No. 10/185,511, filed Jun. 28, 2002 entitled "Systems And Methods For Issuing Usage Licenses For Digital Content And Services";

U.S. patent application Ser. No. 10/364,627, filed Feb. 11, 2003 entitled "Publishing Digital Content Within an Organization in Accordance with a Digital Rights Management (RM) System"; and U.S. patent application Ser. No. 10/364,115, filed Feb. 11, 2003 entitled "Publishing Digital Content Within an Organization in Accordance with a Digital Rights Management (RM) System."

TECHNICAL FIELD

This invention relates to a rights management (RM) system. More particularly, the invention relates to employing an RM system to publish digital content in an organization such as an office or corporation or the like such that rendering and use of the content within the organization may be constrained according to corresponding use or license terms. Even more particularly, the present invention relates to publishing and rendering and using rights-managed content within the organization including documents, databases, electronic mail, tables, and presentations.

BACKGROUND OF THE INVENTION

Rights management and enforcement is highly desirable in connection with digital content such as digital audio, digital video, digital text, digital data, digital multimedia, etc., where such digital content is to be distributed to one or more users. Digital content could be static, such as a text document, for example, or it could be streamed, such as the streamed audio/video of a live event. Typical modes of distribution include tangible devices such as a magnetic (floppy) disk, a magnetic tape, an optical (compact) disk (CD), etc., and intangible media such as an electronic bulletin board, an electronic network, the Internet, etc. Upon being received by the user, such user renders the digital content with the aid of appropriate rendering software such as an audio player, a text displayer, etc. on a personal computer or other hardware.

In one scenario, a content owner or rights-owner such as an author, a publisher, a broadcaster, etc., wishes to distribute such digital content to each of many users or recipients in exchange for a license fee or some other consideration. In such scenario, then, the content may be an audio recording, a multimedia presentation, etc., and the purpose of the distribution is to generate the license fee. Such content owner, given the choice, would likely wish to restrict what the user can do with such distributed digital content. For example, the content owner would like to restrict the user from copying and re-distributing such content to a second user, at least in a manner that denies the content owner a license fee from such second user.

In addition, the content owner may wish to provide the user with the flexibility to purchase different types of use licenses at different license fees, while at the same time holding the user to the terms of whatever type of license is in fact purchased. For example, the content owner may wish to allow distributed digital content to be rendered only a limited number of times, only for a certain total time, only on a certain type of machine, only on a certain type of rendering platform, only by a certain type of user, etc.

In another scenario, a content developer, such as an employee in or member of an organization, wishes to distribute such digital content to one or more other employees or members in the organization or to other individuals outside the organization, but would like to keep others from rendering the content. Here, the distribution of the content is more akin to organization-based content sharing in a confidential or restricted manner, as opposed to broad-based distribution in exchange for a license fee or some other consideration.

In such scenario, then, the content may be a document presentation, spreadsheet, database, email, or the like, such as may be exchanged within an office setting, and the content developer may wish to ensure that the content stays within the organization or office setting and is not rendered by non-authorized individuals, such as for example competitors or adversaries. Again, such content developer wishes to restrict what a recipient can do with such distributed digital content. For example, the content owner would like to restrict the user from copying and re-distributing such content to a second user, at least in a manner that exposes the content outside the bounds of individuals who should be allowed to render the content.

In addition, the content developer may wish to provide various recipients with different levels of rendering rights. For example, the content developer may wish to allow protected digital content to be viewable and not printable with respect to one class of individual, and viewable and printable with respect to another class of individual.

However, and in either scenario, after distribution has occurred, such content owner/developer has very little if any control over the digital content. This is especially problematic in view of the fact that practically every personal computer includes the software and hardware necessary to make an exact digital copy of such digital content, and to download such exact digital copy to a write-able magnetic or optical disk, or to send such exact digital copy over a network such as the Internet to any destination.

Of course, as part of a transaction wherein the content is distributed, the content owner/developer may require the user/recipient of the digital content to promise not to redistribute such digital content in an unwelcome manner. However, such a promise is easily made and easily broken. A content owner/developer may attempt to prevent such redistribution through any of several known security devices, usually involving encryption and decryption. However, there is likely very little that prevents a mildly determined user from decrypting encrypted digital content, saving such digital content in an un-encrypted form, and then re-distributing same.

RM and enforcement architectures and methods have thus been provided to allow the controlled rendering of arbitrary forms of digital content, where such control is flexible and definable by the content owner/developer of such digital content. Examples of such architectures are set forth in the related applications set forth above, among, others. Such architectures allow and facilitate such controlled rendering, especially in an office or organization environment or the like where documents are to be shared amongst a defined group of individuals or classes of individuals.

A need exists, however, for various systems, structures, and methods in connection with such architectures to effectuate various RM functions.

SUMMARY OF THE INVENTION

The aforementioned needs are satisfied at least in part by the present invention in which a rights-managed document has protected content from an author thereof, whereby a recipient of the document can render the protected content with a corresponding license if the recipient satisfies terms set forth in the license. In the document, a storage portion has a message that the document is rights management protected, and a custom data portion has a section including the protected content. The recipient if enabled can render the protected content in the custom data portion and if not enabled can only review the storage portion having the message.

An enabled recipient handles the received rights-managed document by recognizing that the document has the protected content in the custom data portion thereof, and discounting the storage portion of the document. Thus, the recipient examines the custom data portion of the document and proceeds based thereon to render the protected content in the custom data portion.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings:

FIG. 4 is a block diagram showing the structure of an RM-protected email such as may be used in the system of FIG. 3 in accordance with one embodiment of the present invention;

FIG. 10 is a block diagram showing the structure of an RM-protected document such as may be used in the system of FIG. 3 in accordance with one embodiment of the present invention;

DETAILED DESCRIPTION OF THE INVENTION

Computer Environment

Figure 1:
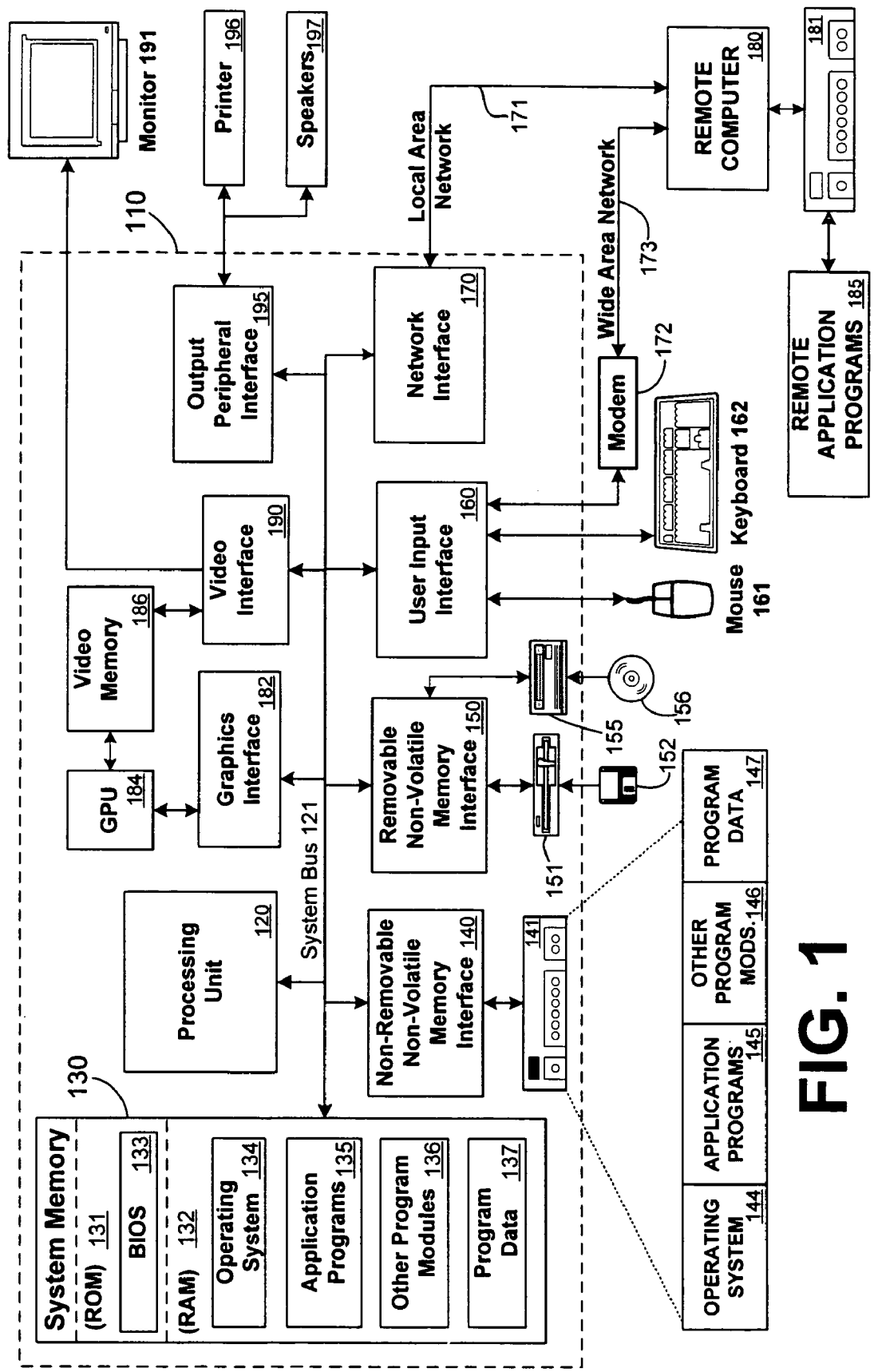
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
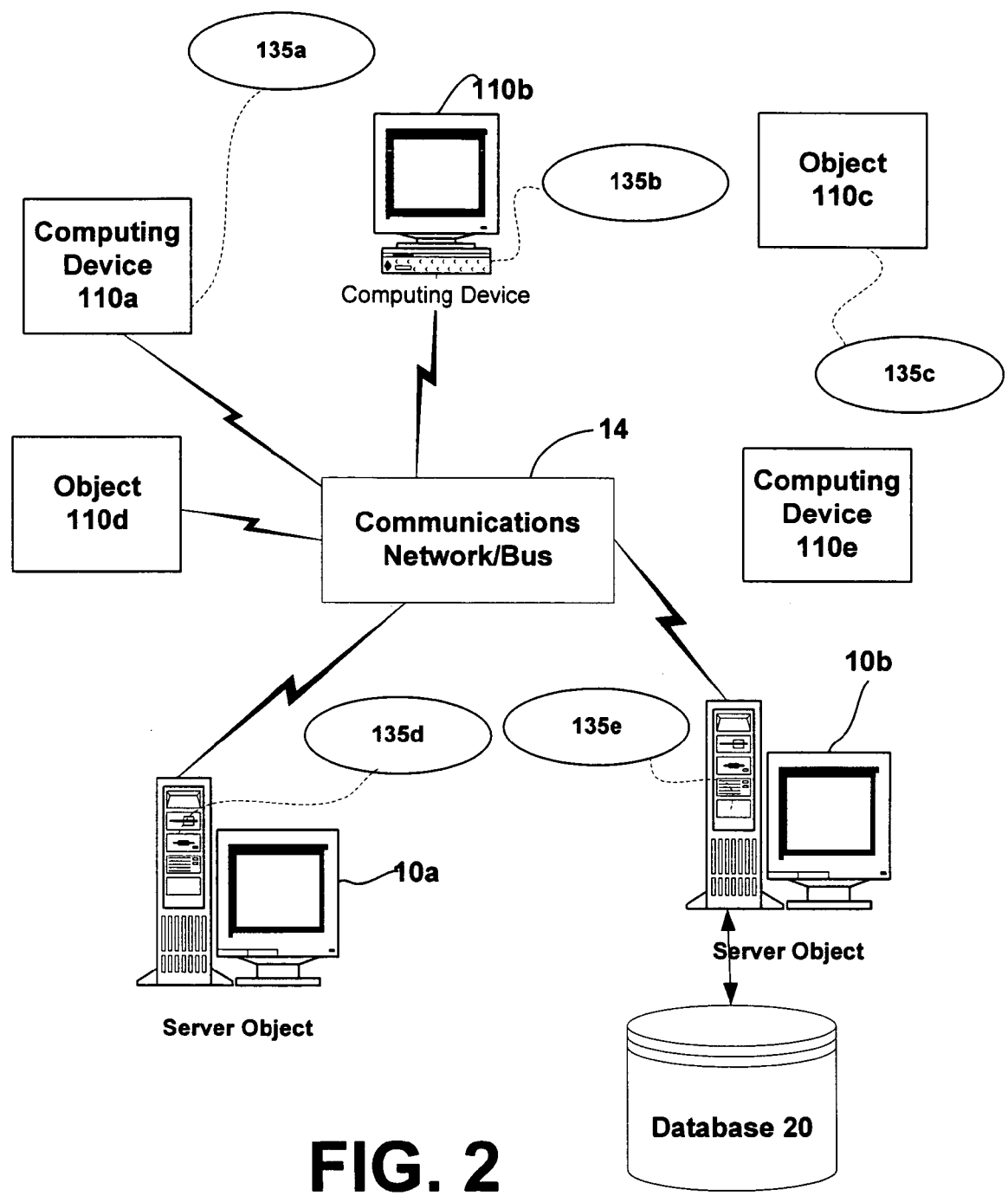
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

Rights Management (RM) Overview

Figure 3:
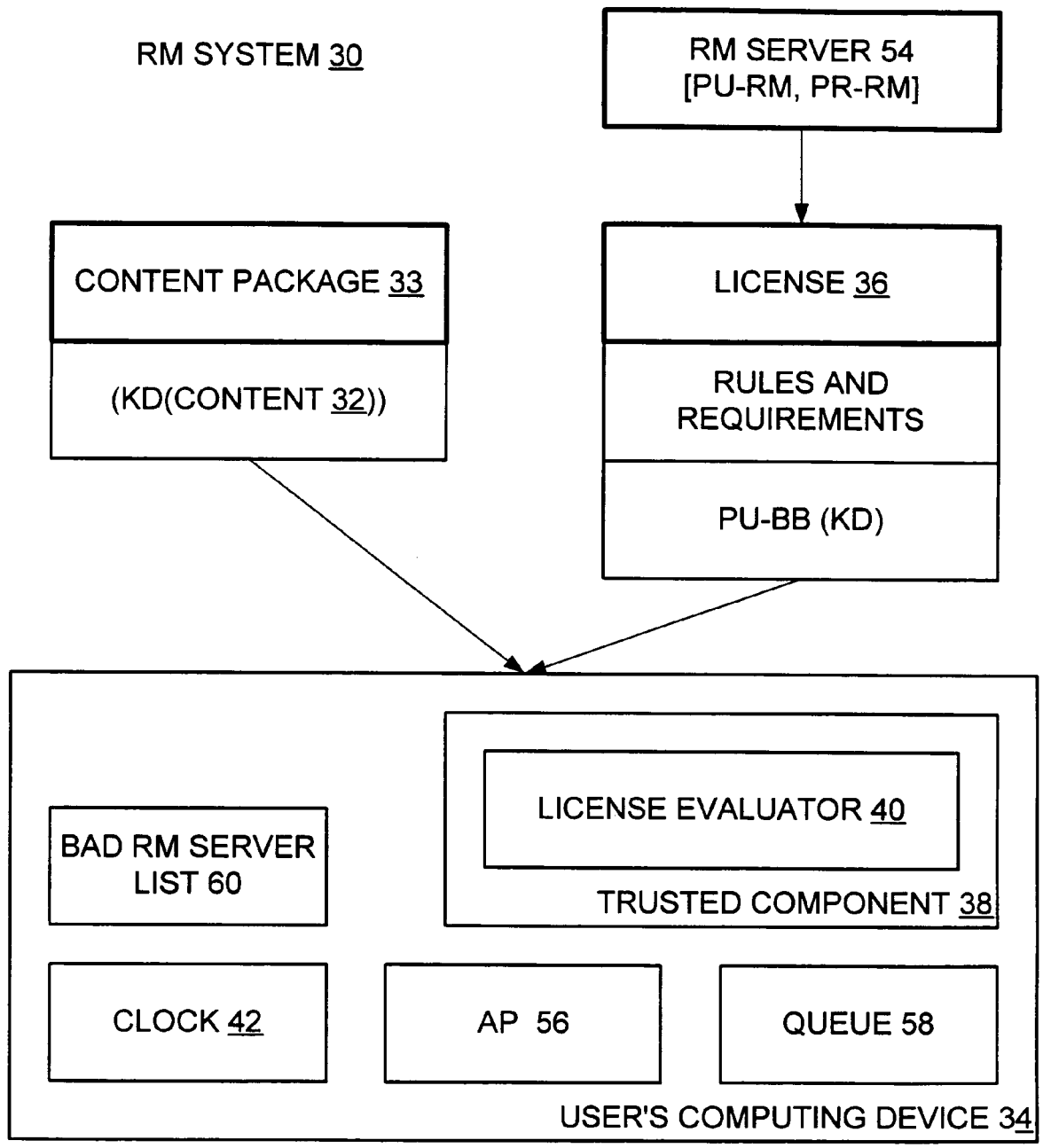
FIG. 3 is a block diagram showing an enforcement architecture of an example of a trust-based system.

As is known, and referring now to FIG. 3, rights management (RM) and enforcement is highly desirable in connection with digital content 32 such as digital audio, digital video, digital text, digital data, digital multimedia, etc., where such digital content 32 is to be distributed to users. Upon being received by the user, such user renders the digital content with the aid of an appropriate rendering device such as a media player, text displayer, etc. on a personal computer 34 or the like.

Typically, a content owner or developer (hereinafter 'owner') distributing such digital content 32 wishes to restrict what the user can do with such distributed digital content 32. For example, the content owner may wish to restrict the user from copying and re-distributing such content 32 to a second user, or may wish to allow distributed digital content 32 to be rendered only a limited number of times, only for a certain total time, only on a certain type of machine, only on a certain type of rendering platform, only by a certain type of user, etc.

However, after distribution has occurred, such content owner has very little if any control over the digital content 32. An RM system 30, then, allows the controlled rendering of arbitrary forms of digital content 32, where such control is flexible and definable by the content owner of such digital content. Typically, content 32 is distributed to the user in the form of a package 33 by way of any appropriate distribution channel. The digital content package 33 as distributed may include the digital content 32 encrypted with a symmetric encryption/decryption key (KD), (i.e., (KD(CONTENT))), as well as other information identifying the content, how to acquire a license for such content, etc.

The trust-based RM system 30 allows an owner of digital content 32 to specify license rules that must be satisfied before such digital content 32 is allowed to be rendered on a user's computing device 34. Such license rules can include the aforementioned temporal requirement, and may be embodied within a digital license or use document (hereinafter 'license') 36 that the user/user's computing device 34 (hereinafter, such terms are interchangeable unless circumstances require otherwise) must obtain from the content owner or an agent thereof. Such license 36 also includes the decryption key (KD) for decrypting the digital content, perhaps encrypted according to a key decryptable by the user's computing device 34. As seen in FIG. 3, such encrypting key is a public key of the user's computing device 34 (PU-BB), and the user's computing device 34 presumably has the corresponding private key (PR-BB) by which (PU-BB(KD)) may be decrypted.

The content owner for a piece of digital content 32 must trust that the user's computing device 34 will abide by the rules and requirements specified by such content owner in the license 36, i.e. that the digital content 32 will not be rendered unless the rules and requirements within the license 36 are satisfied. Preferably, then, the user's computing device 34 is provided with a trusted component or mechanism 38 that will not render the digital content 32 except according to the license rules embodied in the license 36 associated with the digital content 32 and obtained by the user.

The trusted component 18 typically has a license evaluator 40 that determines whether the license 36 is valid, reviews the license rules and requirements in such valid license 36, and determines based on the reviewed license rules and requirements whether the requesting user has the right to render the requested digital content 32 in the manner sought, among other things. As should be understood, the license evaluator 40 is trusted in the RM system 30 to carry out the wishes of the owner of the digital content 32 according to the rules and requirements in the license 36, and the user should not be able to easily alter such trusted element for any purpose, nefarious or otherwise.

As should be understood, the rules and requirements in the license 36 can specify whether the user has rights to render the digital content 32 based on any of several factors, including who the user is, where the user is located, what type of computing device the user is using, what rendering application is calling the RM system, the date, the time, etc. In addition, the rules and requirements of the license 36 may limit the license 36 to a pre-determined number of renderings, or pre-determined rendering time, for example. Thus, the trusted component 38 may need to refer to a clock 42 on the computing device 34.

The rules and requirements may be specified in the license 36 according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the license evaluator 40 determining that the license 36 is valid and that the user satisfies the rules and requirements therein, the digital content 32 can then be rendered. In particular, to render the content 32, the decryption key (KD) is obtained from the license 36 and is applied to (KD(CONTENT)) from the content package 33 to result in the actual content 32, and the actual content 32 is then in fact rendered.

Rights-Managed Electronic Mail

As may be appreciated, especially within an organization, it is desirable to apply rights management and enforcement to electronic communications between individuals within the organization, such as for example electronic mail messages ('email') between such individuals. Accordingly, each individual in the organization that receives such an email and the content 32 therein can in fact so render such content 32, assuming that the individual obtains a license 36 corresponding to the email content 32 and that the rules and requirements of the obtained license 36 in fact allow the individual to so render. Correspondingly, an individual inside or outside the organization that receives such an email and the content 32 therein cannot render such content 32 if such individual cannot obtain a license 36 corresponding to the email content 32, or if the rules and requirements of the obtained license 36 do not in fact allow the individual to so render.

In one embodiment of the present invention, then, an individual in an organization sending email can apply RM to protect the content 32 of the email such that the protection travels with the email. Thus, even if the email is forwarded from one recipient to another, either inside or outside the organization, the content 32 of the email can only be rendered by a recipient that can obtain a license 36 for the content 32, where the license 36 allows such recipient to in fact render the content 32 of the email. It may be the case that only recipients within the organization can get such a license 36, although it is to be appreciated that other recipients may be granted such a license 36 without departing from the spirit and scope of the present invention. For example, the protection traveling with the email may allow a non-organization recipient to obtain a license 36 as a 'guest' or the like, and the license 36 may be for the guest recipient to read the content 32 only.

As may be appreciated, the license 36 for the email content 32 is typically obtained from an RM server 54 (FIG. 3) operated by or on behalf of the organization. Such license 36 may be sent with the email under at least some circumstances, may be obtained upon opening the email, may be obtained upon downloading the email, may be obtained at the direction of the recipient, and/or the like, all without departing from the spirit and scope of the present invention. Moreover, such obtaining may be performed manually or automatically if circumstances allow, again without departing from the spirit and scope of the present invention.

Significantly, inasmuch as the email with the protected content 32 may be received by an RM-compliant individual with a trusted component 38 and the like, such email should be in a form amenable to such RM-compliant individual. At the same time, inasmuch as the email with the protected content 32 may be received by a non-RM-compliant individual without a trusted component 38 and the like, such email should also be in a form amenable to such non-RM-compliant individual, at least to the extent that the email is recognizable as such by the computing device of the non-RM-compliant individual, informs the non-compliant individual of the protected content 32 therein and does not inappropriately affect the computing device of the non-RM-compliant individual. Put another way, the email with the protected content 32 should be in a more-or-less standard email form so as to be recognized as email, but should also include within the standard form the protected content 32 of the email along with all necessary RM-related information.

Thus, in one embodiment of the present invention, the structure of an RM-protected email message is consistent with a MIME or MAPI representation of an email message with an attachment. Further, in such embodiment, the attachment includes protected content 32 of the email along with other RM-related information. For the sake of simplicity, a somewhat generalized MIME or MAPI structure for an email is set forth:

HEADER
MAIN INFO
   AS PLAIN TEXT
   AS HTML
   AS OTHER
ATTACHMENT(S)

As may be appreciated, the HEADER portion contains basic information relating to the email, including a date, any subject information, the sender, the recipient, and/or the like. The MAIN INFO portion contains the body of the email, which may include text, pictures, links, and/or the like. Notably, inasmuch as some recipients may have different email capabilities, the MAIN INFO portion can include several alternative versions of the body of the email, including the body AS PLAIN TEXT for a recipient that cannot handle anything more complex than plain text, and the body AS HTML for a recipient that can handle more complex HTML (Hyper Text Markup Language) formatting. Of course, other alternative versions of the body may also be included, such as for example a version with the body in an XML (extensible Markup Language) format.

The ATTACHMENT portion can contain most any information that a sender wishes to attach to an email, such as for example one or more files, or one or more other pieces of information to be included with the email. In the latter category, such other piece of information may for example include specific information that the sender wishes to send to the recipient but that does not fit elsewhere within the email.

In one embodiment of the present invention, then, and referring now to FIG. 4, the aforementioned email structure is employed to send RM-compliant email 44, as follows. In particular, and as seen in FIG. 4, in the embodiment, the email 44 contains the protected content 32 as being embedded within an attachment 46 to the email 44, and the trusted component 38 and the email application on the computing device 34 of an RM-compliant individual are aware that such protected content 32 is in the attachment 46.

Of course, such protected content 32 in the attachment 46 is of no use to a non-RM-compliant individual and an email application thereof at a computing device thereof, and accordingly the main info 48 of the email 44 may contain a message to the effect that the email 44 is RM-protected and therefore not viewable by the non-RM-compliant individual. Alternatively, the main info 48 of the email 44 may have another message, an advertisement, a link for more information on RM-compliant email 44, etc. Note that in the case where the trusted component 38 and the email application on the computing device 34 of an RM-compliant individual are aware that such protected content 32 is in the attachment and can access such protected content 32, it may be the case that the message in the main info 48 of the email 44 is bypassed entirely and is not displayed to the RM-compliant individual. Instead, the protected content 32 in the attachment is displayed upon the approval of the trusted component 38 and decryption of such protected content 32. The trusted component 38 and the email application on the computing device 34 of an RM-compliant individual may become aware that the protected content 32 is in the attachment in any appropriate manner without departing from the spirit and scope of the present invention. For example, in examining the attachment 44 of the email 46 certain identifying indicia may be found.

In one embodiment of the present invention, and as also seen in FIG. 4, the attachment 46 of the email 44 with the protected content 32 is organized in the following manner. In general, the attachment 46 has the protected content 32 and also has rights data 50 relating to the protected content 32. As may be appreciated, the rights data 50 may be defined by the sender of the email or may be defined by a template selected by the sender of the email, and sets forth each individual or group of individuals that has rights with respect to the protected content 32, and for each such individual or group of individuals a description of such rights. Thus, and as an example, the rights may specify that one particular individual can read, print, and forward the email and copy the contents of same for an unlimited duration, but that a particular group of individuals may only read and reply to the email for the next seven days. Note that the individuals or groups of individuals set forth in the rights data 50 may extend beyond the scope of the recipients of the email 44, based on the assumption that such recipients may forward the email 44 to other recipients.

Significantly, and as was set forth above, the protected content 32 in the attachment 46 of the email 44 is encrypted according to a cryptographic key, and the rights data 50 may include a decryption key (KD) for decrypting the encrypted content 32. Of course, such decryption key (KD) should itself be encrypted to prevent unauthorized use thereof. Accordingly, in one embodiment of the present invention, the decryption key (KD) in the rights data 50 is encrypted according to a public key of the aforementioned RM server 54 (PU-RM) operated by or on behalf of the organization to result in (PU-RM(KD)). Alternatively, the rights data 50 is encrypted according to a public key of the sender (PU-SE) to result in (PU-SE(KD)) and only the aforementioned RM server 54 can gain access to a corresponding private key of the sender (PR-SE). Thus, only the RM server 54 having the private key (PR-RM) corresponding to (PU-RM) or access to (PR-SE) can apply same to (PU-RM(KD)) or (PU-SE(KD)) from the rights data 50 to obtain (KD). Alternatively, only the sender having the private key (PR-SE) corresponding to (PU-SE) can apply same to (PU-SE(KD)) from the rights data 50 to obtain (KD).

As may be appreciated, the RM server 54 in fact obtains (KD) from the rights data 50 in the course of creating the aforementioned license 36 for the protected content 32 and places such (KD) into the license 36, perhaps encrypted according to a key decryptable by the user's computing device 34. Alternatively, the sender in fact obtains (KD) from the rights data 50 in the course of creating the aforementioned license 36 for the protected content 32 and places such (KD) into the license 36, perhaps encrypted according to a key decryptable by the user's computing device 34. As should be understood, the sender should be able to create a license 36 for itself without the aid of the RM server 54 so that such sender can render its own protected content 32.

Still referring to FIG. 4, it is seen that the protected content 32 in the attachment 46 of the email 44 may actually comprise several alternative forms of the body of the email 44, which again may include text, pictures, links, and/or the like. As before, the alternative forms may be provided inasmuch as some recipients may have different email capabilities. As shown, some of the alternative forms may include the body in plain text, in HTML, in XML, in rich text format (RTF), in plain text as HTML, etc. Of course, other alternative versions of the body may also be included in the protected content 32 without departing from the spirit and scope of the present invention. Note that the protected content 32 may also include body information, such as for example whether the body is included in plain text or in HTML, and other body information.

Finally, the protected content 32 may also include attachments to the body of the email 44, which inasmuch as the body of the email 44 is itself part of the attachment 46, will hereinafter be referred to as protected content attachments 52. As may be appreciated, such protected content attachments 52 may be organized in any particular manner without departing from the spirit and scope of the present invention. For example, in one scenario, the attachments 52 may be organized into a list that also includes as a preface or the like the number of attachments 52 and the name of each attachment 52, and includes as a postscript or the like metadata relating to the addenda, if any.

In one embodiment of the present invention, the protected/encrypted content 32 of the email 44 is compressed to reduce the overall size thereof. As may be appreciated, the trusted component 38 may decompress the encrypted and compressed content 32 in the course of decrypting same. As may also be appreciated, such compression provides a significant reduction in the overall size of the email 44 having the protected content 32 in the attachment 46 thereof. Notably, such compression is not presently found by default in existing email formats.

Figure 5:
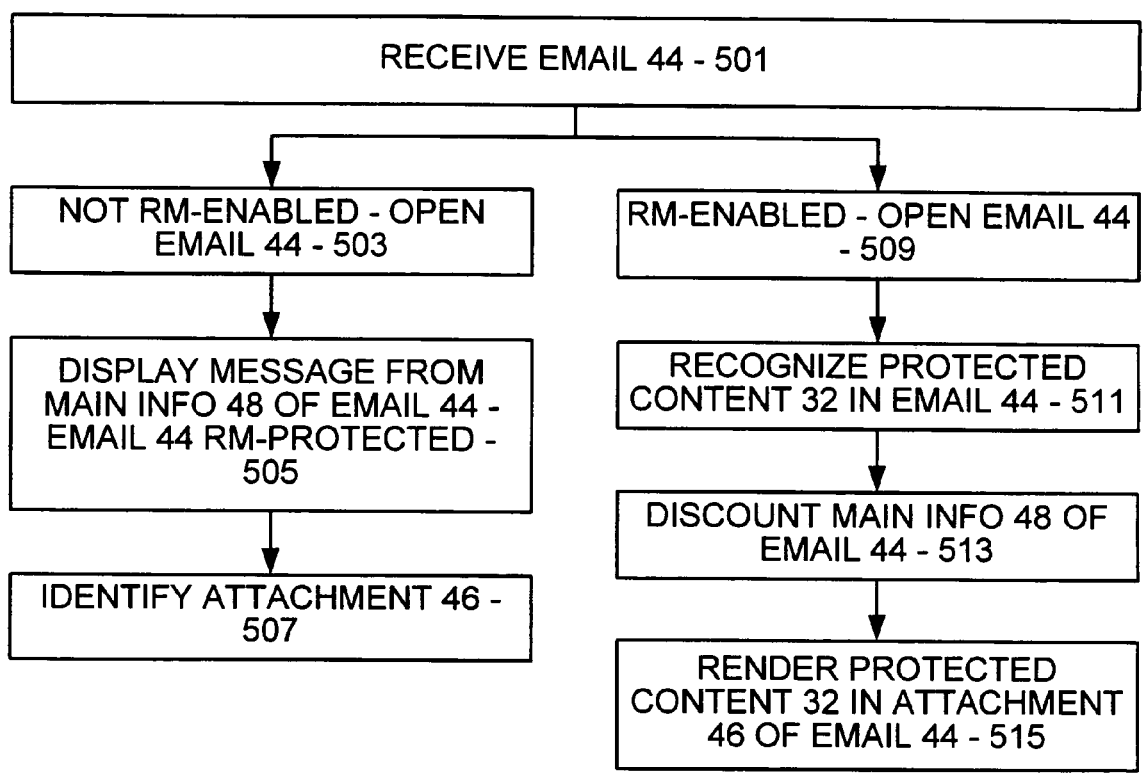
FIG. 5 is a flow diagram showing key steps performed by an email application in attempting to render the RM-protected email of FIG. 4 in accordance with one embodiment of the present invention.

With the email 44 created by a sender thereof as set forth herein and sent to a recipient, then, and turning now to FIG. 5, the recipient upon receiving same (step 501) processes such email 44 in the following manner.

In the case where the recipient and the computing device 34 thereof are not enabled, such recipient and the computing device 34 thereof open the email 44 (step 503). In doing so, and inasmuch as the non-RM-enabled recipient cannot access the protected content 32 therein let alone recognize that the email 44 has such protected content 32 therein, the main info 48 of the email 44 is displayed to the recipient, where such main info 48 is the message that the email 44 is RM-protected and that the recipient does not have rights to view the body of such email 44 (step 505). In addition, the attachment 46 is identified to the non-RM-enabled recipient, even though such recipient would not be able to decrypt the protected content 32 therein (step 507). Thus, the email 44 as received by the non-RM-enabled recipient is handled in the same manner as any other email 44 that would be received by such non-RM-enabled recipient, except for the fact that the message delivered in the email 44 is that the recipient cannot view the body of such email 44 as is set forth in the protected content 32 therein.

In the case where the recipient and the computing device 34 thereof are in fact enabled, such recipient and the computing device 34 thereof also open the email 44 (step 509). Here, though, the RM-enabled recipient in fact recognizes that the email 44 has protected content 32 therein (step 511), discounts the main info 48 of the email 44 (step 513), and instead examines the attachment 46 of the email 44 and proceeds based thereon to render the protected content 32 for the RM-compliant recipient (step 515).

Any appropriate methods and mechanisms may be employed to render the protected content 32 for the RM-compliant recipient without departing from the spirit and scope of the present invention. For example, and in one embodiment of the present invention, and turning now to FIG. 6, the rights data 50 in the attachment 46 of the email 44 is retrieved and forwarded to the RM server 54 (step 601), and such RM server 54 determines that the RM-compliant recipient is one of the individuals or in one of the groups of individuals listed in the rights data 50 (step 603) and thereafter issues a license 36 corresponding to the protected content 32 to the recipient based on the rights data 50 (step 605), where such license 36 specifies the rights the recipient has with respect to the protected content 32 as determined from the rights data 50, and also includes from the rights data 50 a decryption key (KD) for decrypting the encrypted content 32. As was set forth above, such (KD) may be encrypted in a manner decryptable by the trusted component 18 of the computing device 34 of the recipient.

The trusted component 38 of the computing device 34 of the RM-compliant recipient then reviews the issued license 36 to determine that the recipient has the right to view the content 32 (step 607), and thereafter retrieves (KD) from the license 36 and the protected content 32 from the email 44 (step 609), decrypts the protected content 32 with (KD) (step 611), and presents the decrypted content 32 for rendering (step 613). Note that based on the rights the recipient has with respect to the content 32 as set forth in the license 36, the trusted component 38 may take other appropriate actions. For example, if the recipient does not have the right to copy or print the content 32, the trusted component 38 would direct the email application to turn off such functions with respect to such content 32.

As should now be appreciated, in the present invention, rights management is applied to an email 44 by way of a trusted component 18 on a computing device 34 of a RM-compliant recipient, and the email 44 is in a form that is still recognizable to a non-RM-compliant recipient as email 44, even though such non-RM-compliant recipient cannot access the protected content 32 in such email 44. Moreover, inasmuch as the protected content 32 is rights managed, such content 32 can be compressed within the email 44 and decompressed by the trusted component 18.

Propagating RM Protection to Attachments 52 of RM-Protected Email 44

As may be appreciated, although an email 44 may now be RM-protected, for example in the manner set forth above, such RM protection does not automatically extend to any attachments 52 thereof. That is, if an attachment 52 of the email 44, such as for example a word processing document, is not itself RM-protected, the RM protection of the email 44 does not automatically protect the attachment 52 once the email 44 has been rendered by a recipient thereof. Accordingly, and without such RM protection, the attachment 52 may be freely and widely distributed in contravention of the goals and purposes of RM.

Thus, and in one embodiment of the present invention, each attachment 52 of an email 44 is RM-protected upon RM-protecting the email 44 itself, presuming that such attachment 52 is capable of being RM-protected and has not already been RM-protected. That is, each attachment 52 is RM-protected, but only if such attachment 52 is of a class of items that RM-protection can be applied to. For example, it may be that the trusted component 38 of the computing device 34 of the sender of the email 44 can apply RM-protection to a word processing document of a certain type, but not to a word processing document of another type. If an attachment 52 is already RM-protected, applying further RM-protection is not done since to do so could remove more restrictive RM-protection.

RM protection may be applied to an RM-protectable item in any appropriate manner without departing from the spirit and scope of the present invention. In one embodiment of the present invention, RM protection is applied by 'publishing' the item. Such publishing may occur at any appropriate time, such as when sending or saving the email with the item. Briefly, to publish the item, and turning now to FIG. 7, the trusted component 38 or another element on the computing device 34 generates a content key (KD) that is used to encrypt the item (step 701). The content key (KD) is typically a symmetric key although any key can be used to encrypt the digital content. As is known, a symmetric key is employed by a symmetric key algorithm both to encrypt and decrypt. Accordingly, (KD) should be well-hidden when shared between a sender and a receiver.

Thereafter, the item is encrypted with (KD) to form (KD (item)) (step 703). Additionally, rights data 50 corresponding to (KD(item)) is generated (step 705), either by the publisher of the content or by another entity. Note that such rights data 50 may be custom rights data or rights data as obtained from a pre-defined template. As was discussed above, the rights data 50 can include a list of entities that will be entitled to consume the content, the specific rights that each of the entities possesses with respect to the content, and any conditions that may be imposed on those rights.

(KD(item)) is then protected to the aforementioned RM server 54 so that all license requests are directed to such RM server 54. In particular, a public key of the RM server 54 (PU-RM) is employed to encrypt (KD) to result in (PU-RM (KD)) (step 707). Thus, only the RM server 54 with the corresponding private key (PR-RM) can decrypt same to reveal (KD). Additionally, the rights data 50 for the items may also be encrypted by (KD) or (PU-RM), although such encrypted rights data 50 may not be perceived as necessary in all cases.

Thereafter, the rights data 50 is submitted to the RM server 54 for signing, or can be self-signed if permission to do so is given by the RM server 54 (step 709). As may be appreciated, the signed rights data 50 is tamper-resistant in that any changes to the signed rights data 50 will cause the corresponding signature to fail to verify.

Significantly, and in one embodiment of the present invention, the item is provided with a bind ID at some point in the process (step 711), and such bind ID may be included with the signed rights data 50 (step 713). Thus, when the rights data 50 is employed to obtain a license 36 for the item as in FIG. 6, such license 36 also includes the bind ID and thus is tied or bound to such item thereby.

Once the signed rights data 50 is obtained, such signed rights data 50 is concatenated with the corresponding (KD (item)) to form a package 33 containing the RM-protected item (step 715). Thus, a rendering application that is RM-enabled can discover the signed rights data 50 upon attempting to render the package 33, and such discovery triggers the rendering application to initiate a license request against the RM server 54 as in FIG. 6. Note that with regard to an RM-protected email 44, the package 33 is in actuality the attachment 46 of the email 44 as shown in FIG. 4, where the protected content 32 of the attachment 45 is (KD(item)) and where the rights data 50 of the attachment 46 is the signed rights data 50.

Figure 7:
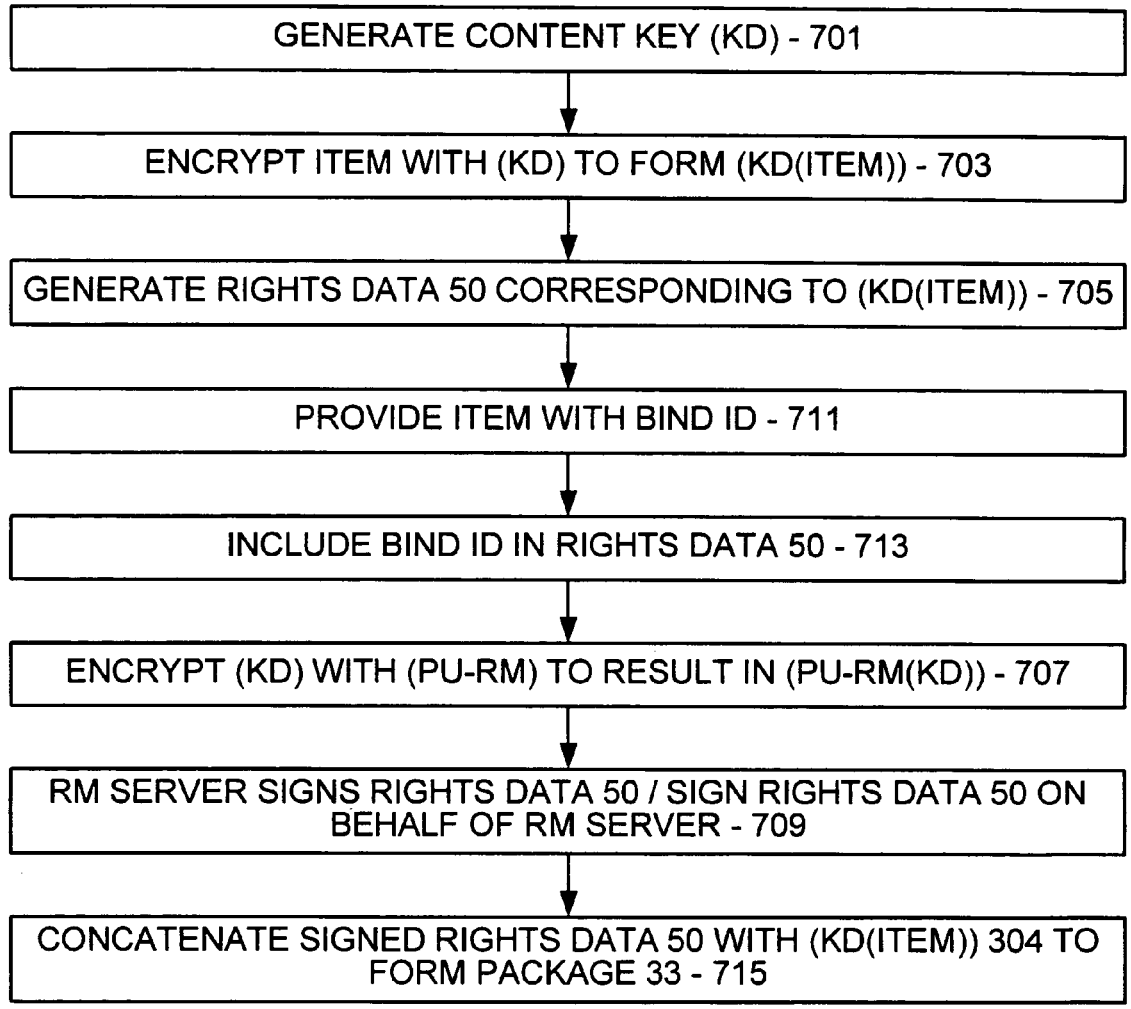
FIG. 7 is a flow diagram showing key steps performed in RM-protecting the email of FIG. 4 in accordance with one embodiment of the present invention.

With the understanding, then, that an email 44 may be RM-protected in a manner such as that shown in FIG. 7, and also that an attachment of such email 44 may also be RM-protected in a manner such as that shown in FIG. 7, a method of propagating RM-protection from an email 44 to each RM-protectable attachment 52 thereof is set forth.

Figure 8:
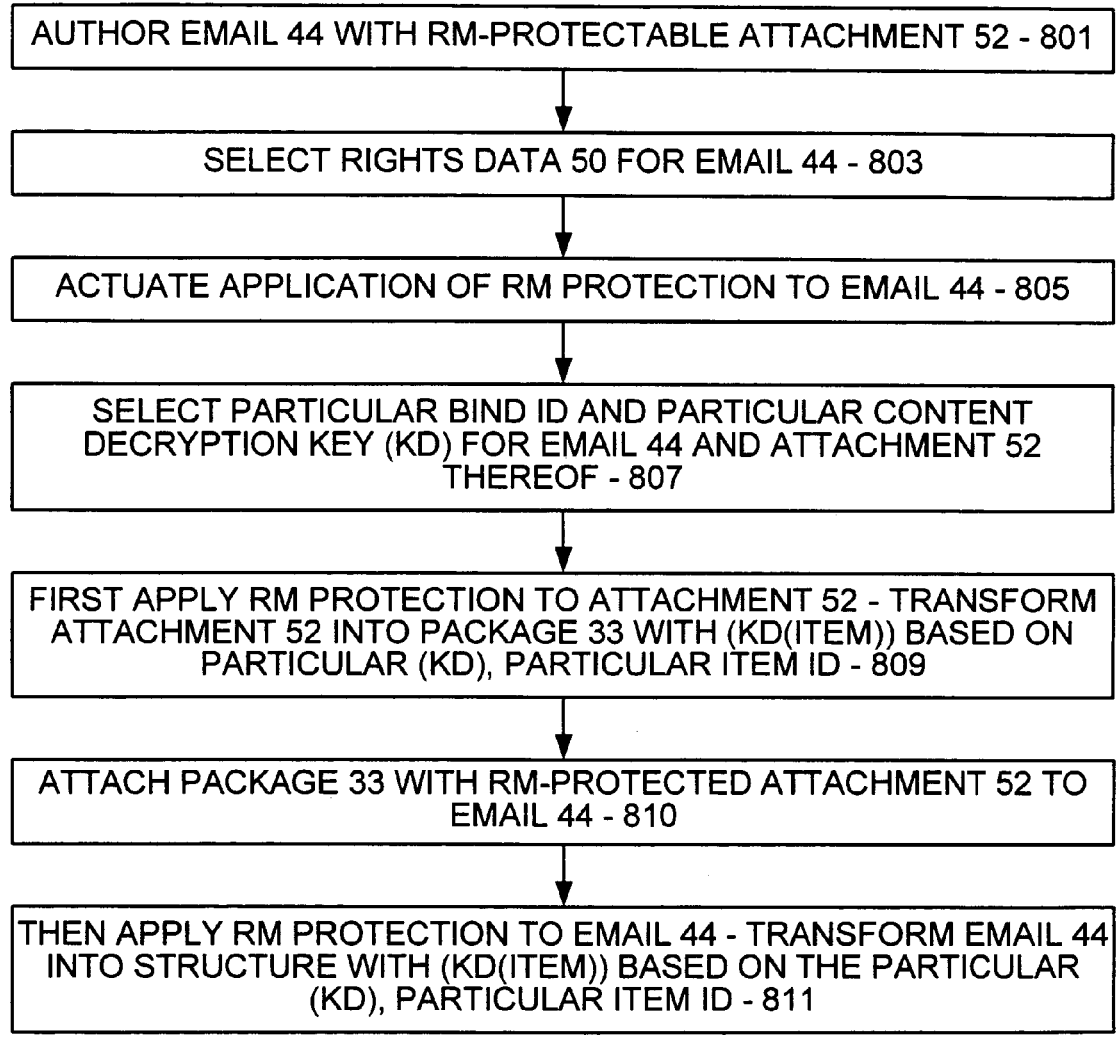
FIG. 8 is a flow diagram showing key steps performed in propagating RM-protection to attachments of the email of FIG. 4 in accordance with one embodiment of the present invention.

In particular, and turning now to FIG. 8, it is presumed that a sender has authored an email 44 with an RM-protectable attachment 52 (step 801), but that RM protection has not as yet been applied to the email 44 or to the attachment 52. Prior to sending or otherwise saving the email 44 with the attachment 52, then, the sender selects rights data 50 for the email 44, either from a menu of rights data choices or from a menu available templates of such rights data 50 (step 803), and actuates application of RM protection to the email 44 (step 805). Significantly, in the course of actuating application of RM protection to the email 44, a particular bind ID and a particular content decryption key (KD) are selected for the email 44 and each RM-protectable attachment thereof (step 807).

In one embodiment of the present invention, prior to applying RM protection to the email 44 itself, RM protection is first applied to each RM-protectable and not already protected attachment 52 of the email 44 (step 809), where such RM protection is applied in a manner akin to that shown in FIG. 7. Accordingly, each attachment 52 is transformed into a package 33 with a (KD(item)) based on the particular (KD), signed rights data 50, and the particular item ID. Thereafter, each such package 33 is attached to the email 44 as a corresponding attachment 52 (step 810), and RM protection is then applied to the email 44 itself (step 811), where such RM protection is again applied in a manner akin to that shown in FIG. 7. Accordingly, the email 44 with each attachment 52 is transformed into a structure such as that shown in FIG. 4, and has a (KD(item)) based on the particular (KD), signed rights data 50, and the particular item ID.

Thus, and significantly, and in one embodiment of the present invention, all of the RM-protected attachments 52 and the RM-protected email 44 itself share the same particular content decryption key (KD) and the same particular bind ID. Accordingly, and as should be appreciated, a license 36 obtained for the email 44 in the manner shown in FIG. 6 will have the particular bind ID of the email 44 and also of all of the RM-protected attachments 52 of the email, and will also have the particular decryption key (KD) that decrypts the email 44 and also of all of the RM-protected attachments 52 of the email.

As may now be appreciated, by having all of the RM-protected attachments 52 and the RM-protected email 44 itself share the same particular content decryption key (KD) and the same particular bind ID, a recipient of the email 44 needs only a single license 36 to render all of such RM-protected attachments 52 and such RM-protected email 44 itself, presuming of course the single license 36 delivers such rendering rights to such recipient. Moreover, such single license 36 has a single set of rights data 50 that is applicable to the email 44 and all of the RM-protected attachments 52 thereof, and accordingly it can be said that the rights attached to the email 44 as embodied in the corresponding single license 36 have been propagated to each RM-protected attachment 52 of such email 44. It should of course be understood that only attachments 52 protected as a result of being included in a protected e-mail 44 share the license 36. Previously-protected attachments 52 included in the email 44 require an additional license 36.

Figure 6:
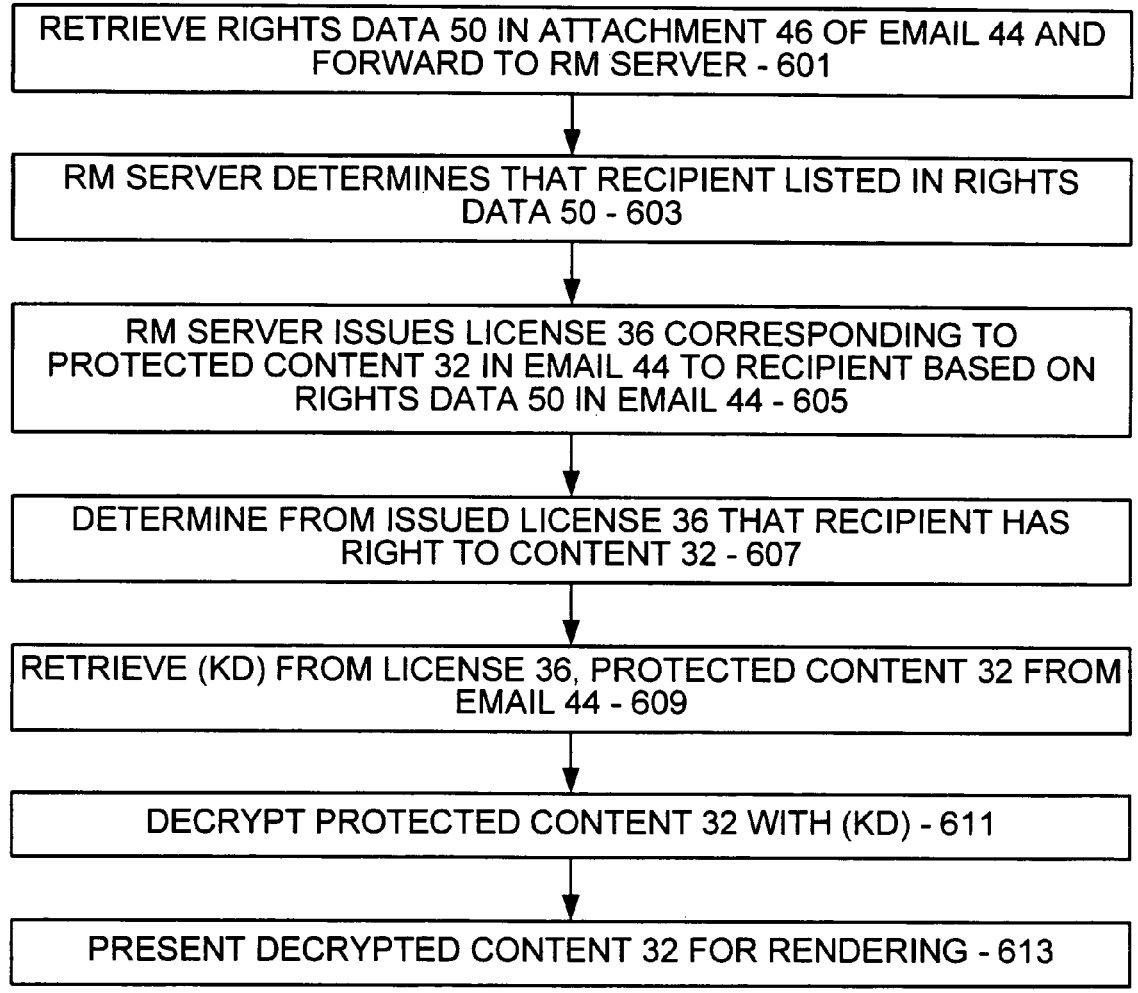
FIG. 6 is a flow diagram showing key steps performed in issuing a license for the email of FIG. 4 and rendering such email based on such license in accordance with one embodiment of the present invention.

Note, though, that the single license 36 cannot be specific to any particular item from among the email 44 and the attachments 52 thereof such that the single license 36 is not applicable to all of such items. Note, too, that in RM protecting each item, as at steps 809 and 811 of FIG. 8, only a single set of the rights data 50 need be generated and submitted, as at steps 705 and 709 of FIG. 7, to result in a single set of signed rights data 50, inasmuch as the single license 36 is generated from the single set of rights data, as is shown in FIG. 6. Nevertheless, each item from among the email 44 and the attachments 52 thereof should be in a package 33 with the single set of signed rights data 50 inasmuch as any attachment 52 within the email 44 may potentially be separated from such email and redistributed to another recipient, and such another recipient needs such signed rights data 50 to obtain another license 36.

Acquiring Decryption Key for RM-Protected Email 44

As was set forth above, to render the protected content 32 in an RM-protected email 44 such as that shown in FIG. 4, where the protected content 32 is encrypted according to a content key (KD), a recipient of the email 44 must obtain a corresponding license 36 with (KD) from the RM server 54, satisfy the rights and conditions set forth in the license 36, obtain (KD) from the license 36, and apply (KD) to decrypt the protected content 32 in such email 44, all in a manner such as that shown in FIG. 6. However, and significantly, the RM server 54 is likely only available to the recipient of the email 44 by way of a network or the like, and it can be the case that the recipient is not always connectively coupled to such RM server 54 by way of such network. That is, it may be the case that the recipient is connectively coupled to the network to receive the email 44, and does not at such time obtain a corresponding license 36 for the protected content 32 in the email 44.

Thus, it may be the situation that the recipient of the email 44 is later out of network connectivity with the RM server 54 and therefore cannot obtain the corresponding license 36 with (KD) to render the protected content 32 of the email 44. Accordingly, and in one embodiment of the present invention, the email application 56 and the trusted component 38 in combination work to automatically obtain a license 36 for each email 44 with protected content 32 therein when such email is first received by the recipient and such recipient is connectively coupled to the network and to the RM server 54 thereby.

Figure 9:
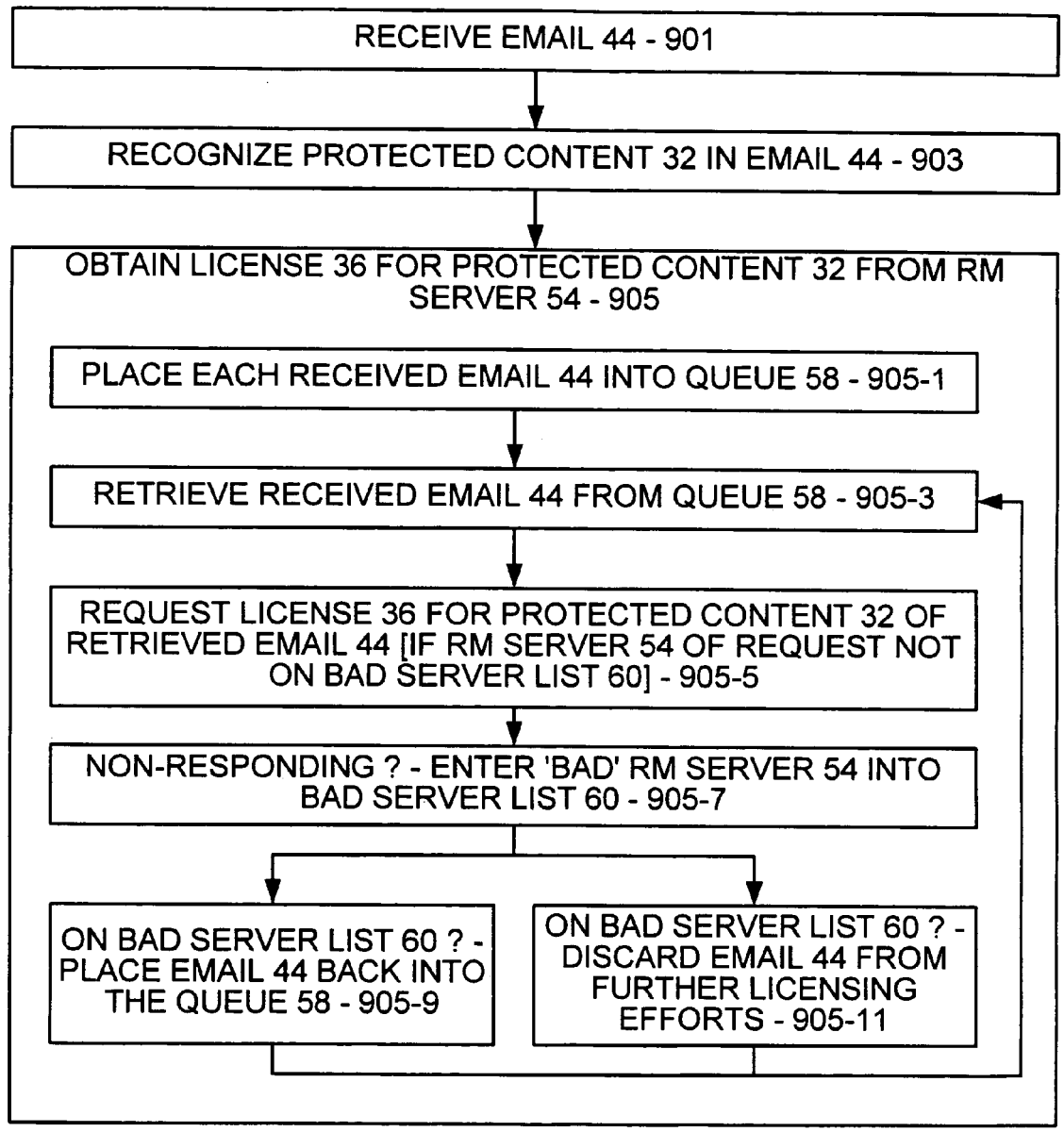
FIG. 9 is a flow diagram showing key steps performed in acquiring a license with a decryption key (KD) for the email of FIG. 4 in accordance with one embodiment of the present invention.

In particular, and turning now to FIG. 9, in one embodiment of the present invention, while connectively coupled to the network of the like, the email application 56 of the recipient receives an email 44 (step 901) and recognizes that the received email 44 has protected content 32 therein (step 903). As was set forth above, the email application 56 may determine that the email 44 has protected content 32 therein by way of any appropriate method or mechanism without departing from the spirit and scope of the present invention. Thereafter, the email application 56 and the trusted component 38 work together to obtain a license 36 for the protected content 32 of the email 44 from the RM server 54 while the computing device 34 of the trusted component 38 is still remains connectively coupled to the network by which the RM server 54 may be accessed (step 905).

In one embodiment of the present invention, the email application 56 of the recipient may be presumed to be capable of receiving several emails 44 at a time, especially if the emails 44 are received from an email server (not shown) that must be polled for such emails 44. Accordingly, and in such embodiment, the email application 56 places each received email 44 with protected content 32 therein into a queue 58 (FIG. 3) (step 905-1), and the trusted component 38 retrieves the received email 44 from the queue 58 (step 905-3), and requests the license 36 for the protected content 32 of the retrieved email 44 (step 905-5), preferably in an automatic manner, in a manner transparent to the recipient, and in a manner such as that shown in FIG. 6.

Note that it may be the case that the trusted component 38 can be expected to request a license 36 from any of one or more RM servers 54, where a request is directed to a particular RM server 54 based on RM server information in the corresponding content 32. In such situation, and in appreciation of the fact that at various times each RM server 54 may fail to respond to such a request for a license 36, and in one embodiment of the present invention, the trusted component 38 may maintain a bad server list 60 in which a non-responding or 'bad' RM server 54 may be entered (step 905-7).

Of course, a bad RM server 54 can be expected to be fixed within a reasonable period of time, on the order of five to thirty minutes or so, and accordingly, the trusted component 38 may include a process that removes each entered bad RM server 54 from the list 60 in a corresponding amount of time. Accordingly, a request for a license 36 is made to a particular RM server 54 as at step 905-5, but only if the RM server 54 that the request is directed to is not on the bad server list 60. If such RM server 54 is indeed on the bad server list 60, the corresponding email 44 may be placed back into the queue 58 for later processing (step 905-9), on the presumption that the RM server 54 will eventually be removed from the list 60, or may be discarded from the queue 58 and simply not be licensed by way of the queue 58 (step 905-11).

Note, that in the case where RM protection has been propagated to attachments 52 of email 44, as is the case in connection with FIG. 8, the license 36 that has been obtained by the process of FIG. 9 applies not only to the email 44 but to all of the protected attachments 52 thereof. Accordingly, and again, only one license request need be made per email 44.

Note, too, that the invention of FIG. 9 has up until now been set forth in terms of obtaining a license 36 when a corresponding email 44 with protected content 32 is obtained, such invention is not limited to such email 44. Instead, it should be appreciated that the invention of FIG. 9 may also be employed to obtain a license 36 when any protected content 32 is obtained, especially in the case where the protected content 32 is received over a network and it is possible that the recipient may lose connectivity with such network.

As should now be appreciated, in employing the method of the present invention as set forth in FIG. 9, the trusted component 38 of the computing device 34 of the recipient automatically requests and hopefully obtains a license 36 for protected content 32 in an email 44 or from any other network source when the trusted component 38 is communicatively coupled to the network. Thus, the trusted component 38 as communicatively coupled to the network can automatically contact an appropriate RM server 54 thereon in the course of requesting such license 36. As a result, the license 36 as automatically obtained is present on the computing device 34 and may be employed to render the protected content 32 even in the case where the computing device 34 is out of communication with the network at some later time.

Rights-Managed Document

In a manner similar to an email 44, and as may be appreciated, it is especially desirable within an organization to apply rights management and enforcement to documents such as electronic word processing documents. Accordingly, each individual in an organization that receives such a word processing document or other document with protected content 32 therein can in fact so render such content 32, again assuming that the individual obtains a license 36 corresponding to the content 32 and that the rules and requirements of the obtained license 36 in fact allow the individual to so render. Correspondingly, an individual inside or outside the organization that receives such a word processing document or other document and the content 32 therein cannot render such content 32 if such individual cannot obtain a license 36 corresponding to the content 32, or if the rules and requirements of the obtained license 36 do not in fact allow the individual to so render.

In one embodiment of the present invention, then, an individual in an organization constructing such a word processing document or other document can apply RM to protect the content 32 of the document such that the protection travels with the document. Thus, even if the document is forwarded from one recipient to another, either inside or outside the organization, the content 32 of the document can only be rendered by a recipient that can obtain a license 36 for the document content 32, where the license 36 allows such recipient to in fact render the content 32 of the document. It may be the case that only recipients within the organization can get such a license 36, although it is to be appreciated that other recipients may be granted such a license 36 without departing from the spirit and scope of the present invention. For example, the protection traveling with the document may allow a non-organization recipient to obtain a license 36 as a 'guest' or the like, and the license 36 may be for the guest recipient to read the content 32 only.

As may be appreciated, the license 36 for the document content 32 is typically obtained from an RM server 54 (FIG. 3) operated by or on behalf of the organization. Such license 36 may be sent with the document under at least some circumstances, may be obtained upon opening the document, may be obtained upon downloading the document, may be obtained at the direction of the recipient, and/or the like, all without departing from the spirit and scope of the present invention. Moreover, such obtaining may be performed manually or automatically if circumstances allow, again without departing from the spirit and scope of the present invention.

Significantly, inasmuch as the document with the protected content 32 may be received by an RM-compliant individual with a trusted component 38 and the like, such document should be in a form amenable to such RM-compliant individual. At the same time, inasmuch as the document with the protected content 32 may be received by a non-RM-compliant individual without a trusted component 38 and the like, such document should also be in a form amenable to such non-RM-compliant individual, at least to the extent that the document is recognizable as such by the computing device of the non-RM-compliant individual, informs the non-compliant individual of the protected content 32 therein and does not inappropriately affect the computing device of the non-RM-compliant individual. Put another way, the document with the protected content 32 should be in a more-or-less standard document form so as to be recognized as a document, but should also include within the standard form the protected content 32 of the email along with all necessary RM-related information.

Thus, in one embodiment of the present invention, the structure of an RM-protected document such as a word processing document is consistent with the structure of a non-RM-protected document with a custom data section therein. Further, in such embodiment, the custom data section includes protected content 32 of the document along with other RM-related information. For the sake of simplicity, a somewhat generalized non-RM-protected document structure is set forth:

DOCUMENT PROPERTIES
CUSTOM PROPERTIES
STORAGE
CUSTOM DATA

As may be appreciated, the DOCUMENT PROPERTIES portion contains basic information relating to the document, perhaps including an author, a creation date, and other parameters by which the document can be indexed. The CUSTOM PROPERTIES portion contains properties information that is not especially of interest to a user or the like and is not especially useful for indexing purposes but may be of use to another application. For example, such custom properties information may comprise content tagged according to an XML format for use by the another application. The STORAGE portion contains the body of the document, which may include text, pictures, links, and/or the like.

In a manner similar to email, inasmuch as the document may be rendered by different document applications, the document can include alternative versions of the body of the document. Here, however, the different versions are set forth within the CUSTOM DATA portion. More generally, the CUSTOM DATA portion can contain most any kind of information that is or can be made available to another application that may wish to access the document. Thus, the CUSTOM DATA portion may contain sections with alternative versions of the body of the document for such another application, may contain sections with other information, documentation, content, etc. for use by another application, may contain sections with extra data for use by an extension of an application, and/or the like.

In one embodiment of the present invention, then, and referring now to FIG. 10, the aforementioned document structure is employed to send and RM-compliant document 62 such as a word processing document, as follows. In particular, and as seen in FIG. 10, in the embodiment, the document 62 contains the RM-protected content 32 as being embedded within a section 64 of the custom data 66 of the document 62, and the trusted component 38 and the document application 56 on the computing device 34 of an RM-compliant individual are aware that such protected content 32 is in the section 64 of the custom data 66.

Of course, such protected content 32 in the custom data 66 is of no use to a non-RM-compliant individual and a document application thereof at a computing device thereof, and accordingly the storage 68 of the document 62 may contain a message to the effect that the document 62 is RM-protected and therefore not viewable by the non-RM-compliant individual. Alternatively, the storage 68 of the document 62 may have another message, an advertisement, a link for more information on the RM-compliant document 62, etc. Note that the document application could be employed to alter the message in the storage 68 unless such storage 68 is password-protected to in effect lock the message.

Note too that in the case where the trusted component 38 and the document application 56 on the computing device 34 of an RM-compliant individual are aware that such protected content 32 is in the custom data 66 and can access such protected content 32, it may be the case that the message in the storage 68 of the document 62 is bypassed entirely and is not displayed to the RM-compliant individual. Instead, the protected content 32 in the custom data 66 is displayed upon the approval of the trusted component 38 and decryption of such protected content 32. The trusted component 38 and the document application 56 on the computing device 34 of an RM-compliant individual may become aware that the protected content 32 is in the custom data 66 in any appropriate manner without departing from the spirit and scope of the present invention. For example, in examining the section 64 of the custom data 66 of the document 62 with the protected content 32, certain identifying indicia may be found.

The protected content 32 in the custom data 66 may be in any particular format without departing from the spirit and scope of the present invention. For example, the protected content 32 may comprise encrypted data in a format specific to the document application 56, or may comprise encrypted data in a format not specific to the document application 56. In the latter case, such format may for example comprise HTML, RTF, or an XML-based format. Note that with regard to HTML, XML, and the like, a rights-managed viewer application may be provided to allow an individual to view such protected content 32 while at the same time making it more difficult to edit such protected content 32, if indeed editing is even allowed.

In one embodiment of the present invention, and as also seen in FIG. 10, in addition to a section 64 of the custom data 66 of the document 62 with the protected content 32 therein, the custom data 66 has another section 64 with rights data 50 relating to the protected content 32. Similar to before, the rights data 50 may be defined by the author of the document 62 or may be defined by a template selected by the author of the document 62, and sets forth each individual or group of individuals that has rights with respect to the protected content 32, and for each such individual or group of individuals a description of such rights. Thus, and as an example, the rights may specify that one particular individual can read and print the document 62 and copy the contents of same for an unlimited duration, but that a particular group of individuals may only read the document 62 for the next seven days. Presumably, then, the document 62 may be distributed and re-distributed to any number of individuals.

As with email, the protected content 32 in the custom data 66 of the document 62 is encrypted according to a cryptographic key, and the rights data 50 may include a decryption key (KD) for decrypting the encrypted content 32. Of course, such decryption key (KD) should itself be encrypted to prevent unauthorized use thereof. Accordingly, in one embodiment of the present invention, the decryption key (KD) in the rights data 50 is encrypted according to a public key of the aforementioned RM server 54 (PU-RM) operated by or on behalf of the organization to result in (PU-RM(KD)). Alternatively, the rights data 50 is encrypted according to a public key of the author (PU-AU) to result in (PU-AU(KD)) and only the aforementioned RM server 54 can gain access to a corresponding private key of the author (PR-AU). Thus, only the RM server 54 having the private key (PR-RM) corresponding to (PU-RM) or access to (PR-AU) can apply same to (PU-RM(KD)) or (PU-AU(KD)) from the rights data 50 to obtain (KD). Alternatively, only the author having the private key (PR-AU) corresponding to (PU-AU) can apply same to (PU-AU(KD)) from the rights data 50 to obtain (KD).

As may be appreciated, the RM server 54 in fact obtains (KD) from the rights data 50 in the course of creating the aforementioned license 36 for the protected content 32 and places such (KD) into the license 36, perhaps encrypted according to a key decryptable by the user's computing device 34. Alternatively, the sender in fact obtains (KD) from the rights data 50 in the course of creating the aforementioned license 36 for the protected content 32 and places such (KD) into the license 36, perhaps encrypted according to a key decryptable by the user's computing device 34. As should be understood, the sender should be able to create a license 36 for itself without the aid of the RM server 54 so that such sender can render its own protected content 32.

In one embodiment of the present invention, the protected/encrypted content 32 of the document 62 is compressed to reduce the overall size thereof. As may be appreciated, the trusted component 38 may decompress the encrypted and compressed content 32 in the course of decrypting same. As may also be appreciated, such compression provides a significant reduction in the overall size of the document 62 having the protected content 32 in the custom data 66 thereof. Notably, such compression is not presently found by default in existing document formats.

Figure 11:
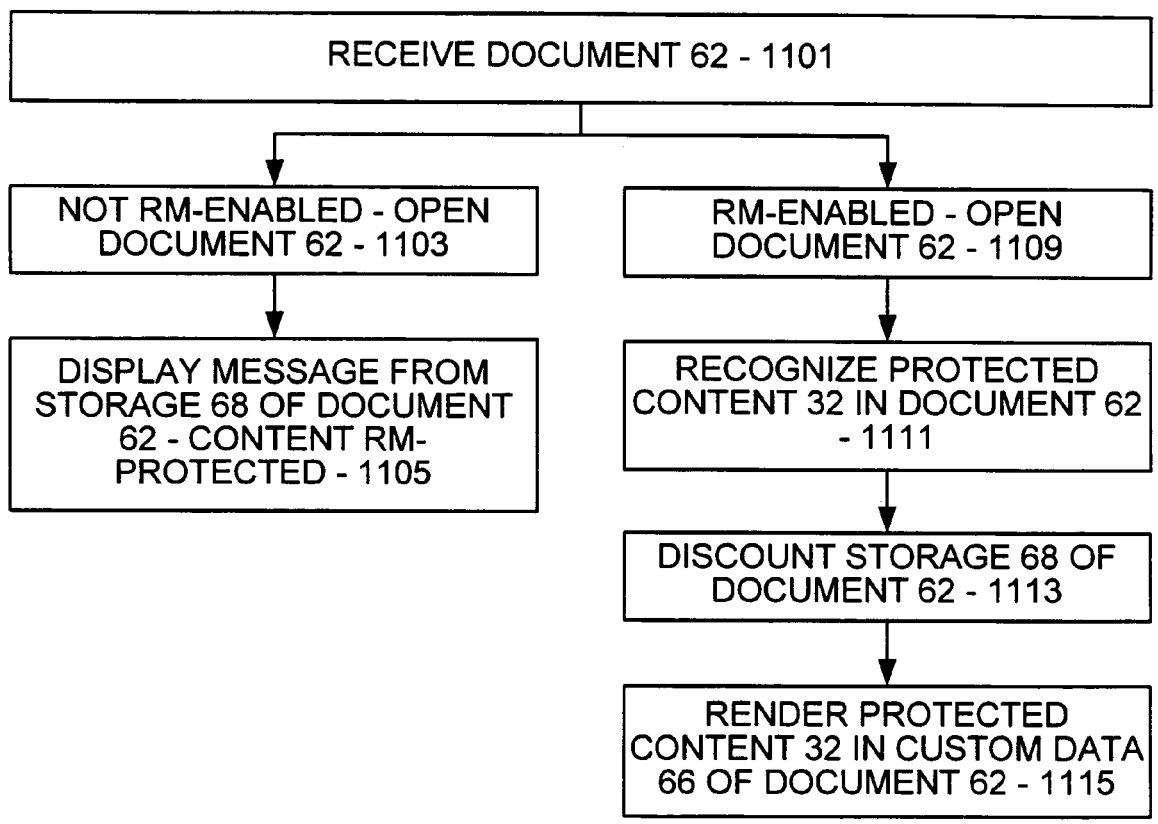
FIG. 11 is a flow diagram showing key steps performed by a document application in attempting to render the RM-protected document of FIG. 10 in accordance with one embodiment of the present invention.

With the document 62 created by an author thereof as set forth herein and forwarded to another individual, then, and turning now to FIG. 11, the receiving individual upon receiving same (step 1101) processes such document 62 in the following manner.

In the case where the recipient and the computing device 34 thereof are not enabled, such recipient and the computing device 34 thereof open the document 62 (step 1103). In doing so, and inasmuch as the non-RM-enabled recipient cannot access the protected content 32 therein let alone recognize that the document 62 has such protected content 32 therein, the storage 68 of the document 62 is displayed to the recipient, where such storage 62 is the message that the document 62 is RM-protected and that the recipient does not have rights to view the protected content 32 of such document 62 (step 1105). Here, the sections 64 of the custom data 66 of the document 62 with the rights data 50 and the protected content 32 are not normally identified to the non-RM-enabled recipient, although it is presumed that a determined recipient could find same. Nevertheless, such determined recipient would not be able to decrypt the protected content 32 therein. Thus, the document 62 as received by the non-RM-enabled recipient is handled in the same manner as any other document 62 that would be received by such non-RM-compliant recipient, except for the fact that the message in the storage 68 of the document 44 is that the recipient cannot view the protected content 32 of such document 62 as is set forth in the custom data 66 therein.

In the case where the recipient and the computing device 34 thereof are in fact enabled, such recipient and the computing device 34 thereof also open the document 62 (step 1109). Here, though, the RM-enabled recipient in fact recognizes that the document 62 has protected content 32 therein (step 1111), discounts the storage 68 of the document 62 (step 1113), and instead examines the sections 64 of the custom data 66 with the rights data 50 and the protected content 32 and proceeds based thereon to render the protected content 32 for the RM-compliant recipient (step 1115).

As before, any appropriate methods and mechanisms may be employed to render the protected content 32 for the RM-compliant recipient without departing from the spirit and scope of the present invention. For example, a method similar to that shown in FIG. 6 may be employed.

In one embodiment of the present invention, each license 36 obtained for corresponding protected content 32 in the custom data 66 of the document 62 is placed into the custom document 62 in another section 64 of the custom data 66. Thus, each license 36 travels with a corresponding piece of protected content 32 in a document 62, and the protected content 32 in a document 62 may travel with multiple licenses 36.

In one embodiment of the present invention, the custom data 66 has another section 64 with transforms 70 that specify to a document application 56 or the like how to get at the protected content 32. In particular, such transforms 70 may have a RM part specifying each section 64 of custom data 66 that is encrypted and each section 64 of custom data with a license 36 by which a decryption key (KD) may be obtained. In addition, such transforms 70 may have a compression part specifying each section 64 of custom data 66 that is compressed and how the section is compressed. Of course, the transforms 70 may have other parts with other accessing information without departing from the spirit and scope of the present invention.

As should now be appreciated, in the present invention, rights management is applied to a document 62 by way of a trusted component 18 on a computing device 34 of a RM-compliant recipient, and the document 62 is in a form that is still recognizable to a non-RM-compliant recipient as a document 62, even though such non-RM-compliant recipient cannot access the protected content 32 in such document 62. Moreover, inasmuch as the protected content 32 is rights managed, such content 32 can be compressed within the document 62 and decompressed by the trusted component 18.

Dynamically Applying RM Protection to Document in Document Store

RM protection has heretofore been discussed in terms of a particular individual within an organization or the like creating some sort of content and then protecting same prior to distributing the content to another individual within the organization. However, it may also be the case that a particular individual within an organization or the like creates a document with some sort of content therein and then merely places the document in an unprotected form in a document store managed by or on behalf of the organization. In such a situation, then, and in one embodiment of the present invention, the document store in response to a request for the document from an individual has the responsibility to respond to such request by determining that the requesting individual has the right to access such document, by RM-protecting the document, and then by delivering the RM-protected document to the requesting individual.

In connection with the document store of the present invention, then, and turning now to FIG. 12, it may be presumed that such document store 72 stores a plurality of documents 74 in some sort of logical arrangement, such as one or more folders 76 and sub-folders 76 (hereinafter, 'folders') or the like. Significantly, and in one embodiment of the present invention, for each folder 76, the document store 72 handles all documents 74 within the folder 76 in a like manner with respect to RM protection. Accordingly, an individual defines the RM protection to be applied to a document 74 by placing the document 74 in a particular folder 76 based on the particular folder 76 having a predefined set of rights associated therewith. Again, each document 74 within a particular folder 76 is not RM-protected, but RM-protection is applied to a copy of the document 74 by the document store 72 when the copy of the document 74 is delivered to a requesting individual.

Typically, each folder 76 has access controls 78 associated therewith, such as read-only, read-write, all rights, and the like, where the access controls are defined for each individual and/or for each group of individuals that may access the contents of the folder 76. In one embodiment of the present invention, such access controls 78 as defined for a requesting individual are employed to define the RM-protection that is to be applied to each copy of a document 74 delivered to such requesting individual. Thus, it may be the case that read-only access would translate to view-only RM protection rights, read-write access would translate to view, edit, save, and copy RM protection rights, and all rights would translate to view, edit, save, copy, print, save locally, and change or delete RM protection rights.

In another embodiment of the present invention, in addition to or as an alternative to setting RM-protection for the documents 74 of a folder 76 by way of the access controls 78 for the folder 76, RM-protection may also be set by defining a specific rights template 80 to be associated with the folder 76. Such rights template 80 may have any particular rights defined therein without departing from the spirit and scope of the present invention, and may for example be common to every document 74 within the folder 76, or may treat different types of documents 76 within the folder 76 differently. In the latter case, for example, the rights template 80 for a particular folder 76 may specify one set of rights for word processing documents 74 and another set for spreadsheet documents 74, may specify one set of rights for documents 74 below a certain size and another set for documents 74 above a certain size, and/or the like.

Note that in contrast with propagated RM protection in an email 44 as set forth above, in dynamically applying RM protection to a document 74 in a folder 76 in a document store 72, each document 76 is assigned a unique bind ID. Accordingly, a license 36 issued for a particular document 74 with a particular bind ID cannot be employed in connection with any other document 74 inasmuch all other documents 74 have a different bind ID.

Note, too, that RM-protection as set for a folder 76, either by way of access controls 78 or by way of a rights template 80, may be changed from time to time by an administrator of the document store 72 or the like. Accordingly, it may be the case that an individual may request a document 74 from a folder 76 of the document store 72 and receive such document 74 with a first set of rights data 50, and then some time later under identical circumstances may request the same document 74 from the same folder 76 of the document store 72 and receive such document 74 with a second set of rights data 50 different from the first set.

Figure 13:
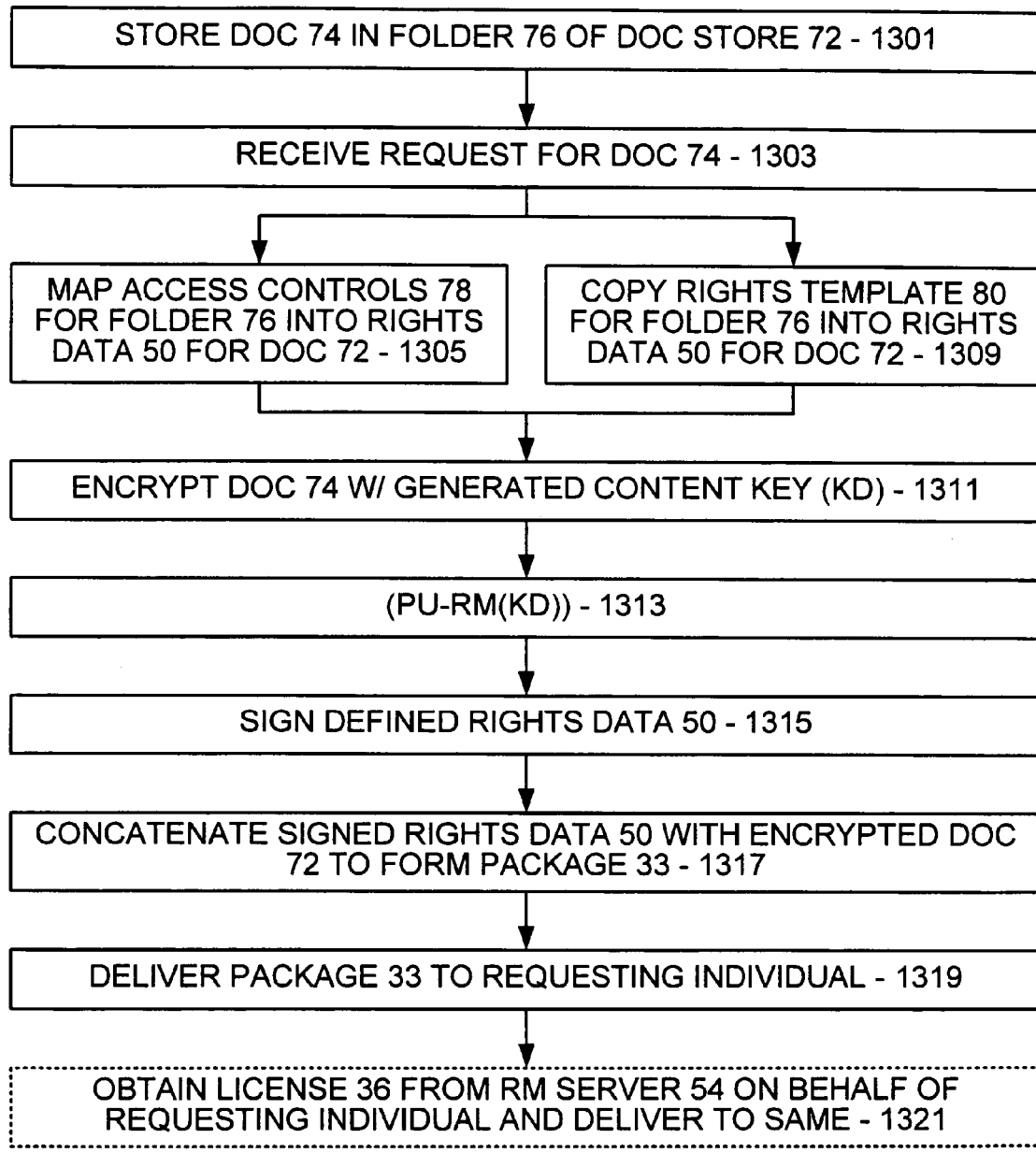
FIG. 13 is a flow diagram showing key steps performed in connection with the document store of FIG. 12 in accordance with one embodiment of the present invention.

Turning now to FIG. 13, a method of using the document store 72 is shown. In such method, and as seen, the process begins by an individual storing a document 74 in a folder 76 of the document store 72 (step 1301). Presumptively, the individual storing the document 74 in the folder 76 has access rights to do so, as defined by the access controls 78 for the folder 76 or elsewhere. As was set forth above, such document as stored in the document store 72 need not be encrypted inasmuch as RM protection will be applied to a copy of the document 74 by the document store 72 when the copy is delivered to a requesting individual. Also, the document store 72 is presumptively secure against attacks by nefarious entities wishing to gain direct access to documents 72 in such document store 72. Of course, encryption may nevertheless be applied to the document 74 when storing same without departing from the spirit and scope of the present invention. Note again that by storing a document 74 in a particular folder 76 of the document store 72, the storing individual determines the RM-protection that is to be applied to the document 74 when retrieved from such particular folder 76 of such document store 72.

At some time after the document 74 is stored in the folder 76 of the document store 72, the document store 72 receives a request for a copy of the requested document 74 from an individual (step 1303). Note here that the requesting individual may be any individual who has access rights to make a request, as defined by the access controls 78 for the folder 76 or elsewhere. Upon receiving the request, the document store checks the access controls 78 for the folder 76 to determine whether the requesting individual has rights that allow the document store 72 to deliver thereto a copy of the requested document 72. If not, the request is denied and the process halts.

Otherwise, the process continues by the document store 72 mapping the access controls 78 for the folder 76 into RM rights that are to be defined in rights data 50 for the copy of the requested document 72 (step 1305). Such mapping may be performed in any appropriate manner without departing from the spirit and scope of the present invention. Performing such mapping is known or should be apparent to the relevant public and therefore need not be defined herein in any detail. Significantly, in mapping the access controls 78, RM rights are defined in rights data 50 not only for the requesting individual but for all other individuals or groups of individuals specified in such access controls 78. Accordingly, and as will be appreciated, the copy of the requested document 74 with the rights data 50 attached thereto can be distributed and redistributed to such other individuals, and each such other individual can employ the rights data 50 to obtain a license 36 to render the document 74.

In addition to or in the alternative to mapping the access controls 78 for the folder 76 into rights data 50 for the copy of the requested document 74, the document store 72 also determines whether the folder 76 also has any rights template 80 associated therewith and if so the document store 72 copies at least a portion of the rights template 80 for the folder 76 into the RM rights that are to be defined in rights data 50 for the copy of the requested document 72 (step 1309). Note that the document store 72 may copy the entire rights template 80 if deemed advisable, or may copy only a portion of the rights template 80 that is relevant to the copy of the requested document 72. For example, if the document is a word processing document 74 and the rights template 80 specifies sets of rights for a number of kinds of documents 74 including word processing documents 74, only the word processing set of rights need be copied, absent other considerations.

Once the rights data 50 for the copy of the requested document 74 have been defined, the document store 72 may then publish the copy of the requested document 74 in a manner similar to that shown in FIG. 7. In particular, the document store 72 by way of a trusted component 38 associated therewith generates a content key (KD) and encrypts the copy of the requested document 74 with same to form (KD(copy)) (step 1311). (KD(copy)) is then protected to an RM server 54 so that all license requests are directed to such RM server 54. In particular, a public key of the RM server 54 (PU-RM) is employed to encrypt (KD) to result in (PU-RM(KD)) (step 1313), and the defined rights data 50 with such (PU-RM (KD)) is submitted to the RM server 54 for signing, or can be self-signed if permission to do so is given by the RM server 54 (step 1315).

Once the signed rights data 50 is obtained, such signed rights data 50 is concatenated with the corresponding (KD (copy)) to form a package 33 containing the RM-protected copy of the requested document 74 (step 1317), and such package 33 is then delivered to the requesting individual (step 1319). Thus, a rendering application of the requesting individual that is RM-enabled can discover the signed rights data 50 upon attempting to render the package 33, and such discovery triggers the rendering application to initiate a request for a corresponding license 36 against the RM server 54 based on the signed rights data 50, as in FIG. 6. Alternatively, the document store 72 may obtain the license 36 from the RM server 54 on behalf of the requesting individual and deliver the obtained license 36 to the requesting individual with the package 33 (step 1321).

RM-Protected Email Conversations

Figure 14:
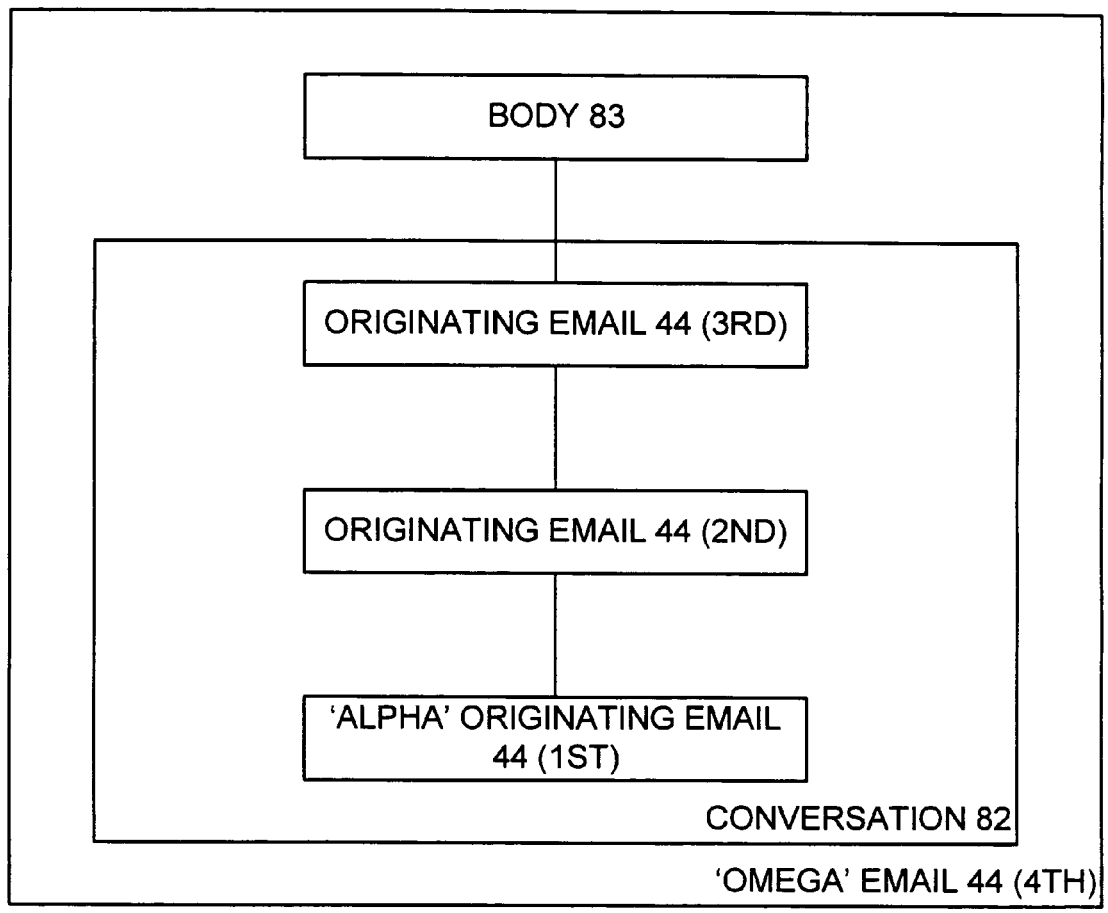
FIG. 14 is a block diagram showing the structure of a conversation within the body of an email.

RM protection of an email 44 has heretofore been discussed in terms of a single email 44, and has not as yet taken into account that an email 44 may be a 'originating' email 44 that is replied by the recipient to the sender and/or may be forwarded by the recipient to another recipient. In either of such situations, and as should be appreciated, and as seen in FIG. 14, it is oftentimes useful and/or desirable to include a copy of the body of the originating email 44 with the reply or forward email 44 so that an email thread or conversation 82 is developed. Thus, the conversation 82 may appear in an 'omega' email 44 and comprise therein a body 83 and a plurality of previously sent and received emails 44 that are available to a recipient of the omega email 44 for easy reference. As may be appreciated, the conversation 82 within an email 44 can extend back an indefinite number of links of originating emails 44 to an 'alpha' email 44 that started the conversation 82.

However, it is also to be appreciated as a dilemma that if an originating email 44 within a conversation 82 is RM-protected, such protected email 44 should not be rendered in the conversation 82, at least for a recipient of the conversation 82 that does not have the right to render such protected email 44. One solution to the aforementioned dilemma is simply to not allow a conversation 82 in an RM environment, or at least to not include RM-protected originating emails 44 in conversations 82. Of course, such a solution is overly broad and is not feasible for reasons that should be apparent, not the least of which is that users typically want conversations 82 to appear in their emails 44.

Figure 15:
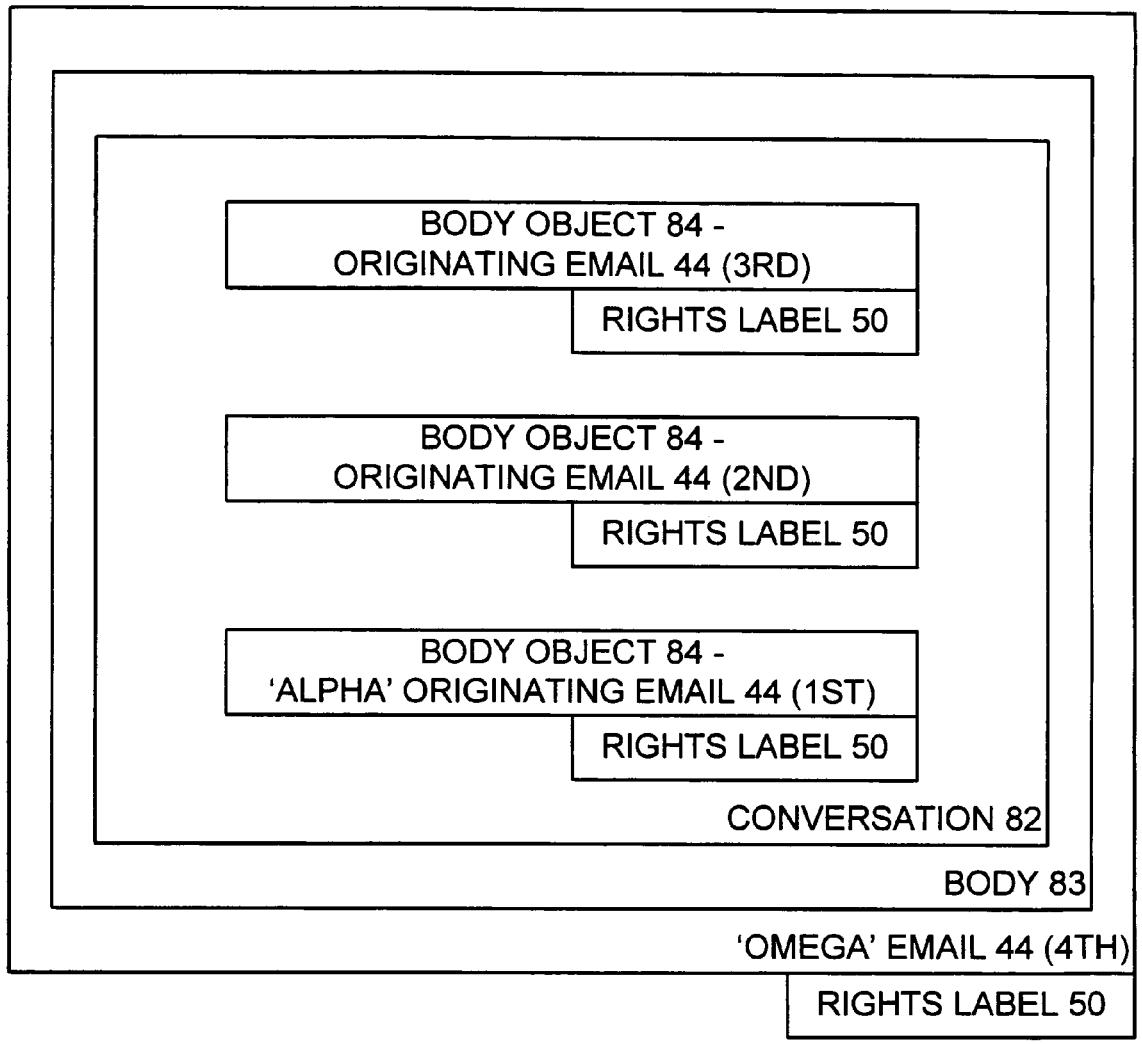
FIG. 15 is a block diagram showing the conversation of FIG. 14 as RM-protected body objects within the body of an RM-protected email in accordance with one embodiment of the present invention.

Accordingly, in one embodiment of the present invention, and as seen in FIG. 15, each originating email 44 in the conversation 82 of an omega email 44 appears in the body 83 of the omega email 44 as a body object 84 that is rights managed according to the RM properties of such originating email 44. Note that such a body object 84 may be any type of body object without departing from the spirit and scope of the present invention. Such a body object 84 is known or should be apparent to the relevant public and therefore need not be described herein in any detail.

For example, the body object 84 for a particular originating email 44 within an omega email 44 may in essence be the corresponding originating email 44 with the RM properties thereof, except that the body 83 of such originating email 44 is set forth within the omega email 44, and has its own rights data 50. Of course, if such originating email 44 itself contains a conversation 82 of originating emails 44, such conversation 82 is stripped out and the originating emails 44 thereof appear separately in the omega email 44 at issue as other body objects 84 thereof.

Thus, a recipient of the omega email 44, which is in turn rights managed, can render each originating email 44 in the conversation 82 of the omega email 44, but only if such recipient has rights to render the omega email 44 and also rights to render the originating email 44 at issue. As a result, it may be the case that one recipient has rights to render some of the originating emails 44/body objects 84 but not others, while another recipient has rights to render all of the originating emails 44/body objects 84.

As should now be appreciated, in the one embodiment of the present invention, the body objects 84 of originating emails 44 appear serially in the omega email 44, usually in reverse chronological order. In an alternative embodiment, however, the conversation 82 of an omega email 44 appears as a single body object 84 therein, and the body object 84 of each originating email 44 in the conversation 82 is nested within a body object 84 of a chronologically next originating email 44. In such case, then, a recipient of the omega email 44, which is in turn rights managed, can render each originating email 44 in the conversation 82 of the omega email 44, but only if such recipient has rights to render the omega email 44 and all intervening originating emails 44. As a result, the lack of rights to render one originating email 44 in the conversation 82 prevents the recipient from rendering all earlier/further nested originating emails 44 in the conversation 82.

Note that the use of serial body objects 84 has an advantage over nested body objects 84 in that a serially appearing body object 84 can in effect be split into two sub-objects 84. Such splitting is especially useful in the case where a comment or note is to be inserted into a body object 84 in an in-line manner. Note, too, that the comment may itself be a body object 84 that is RM-protected.

Figure 12:
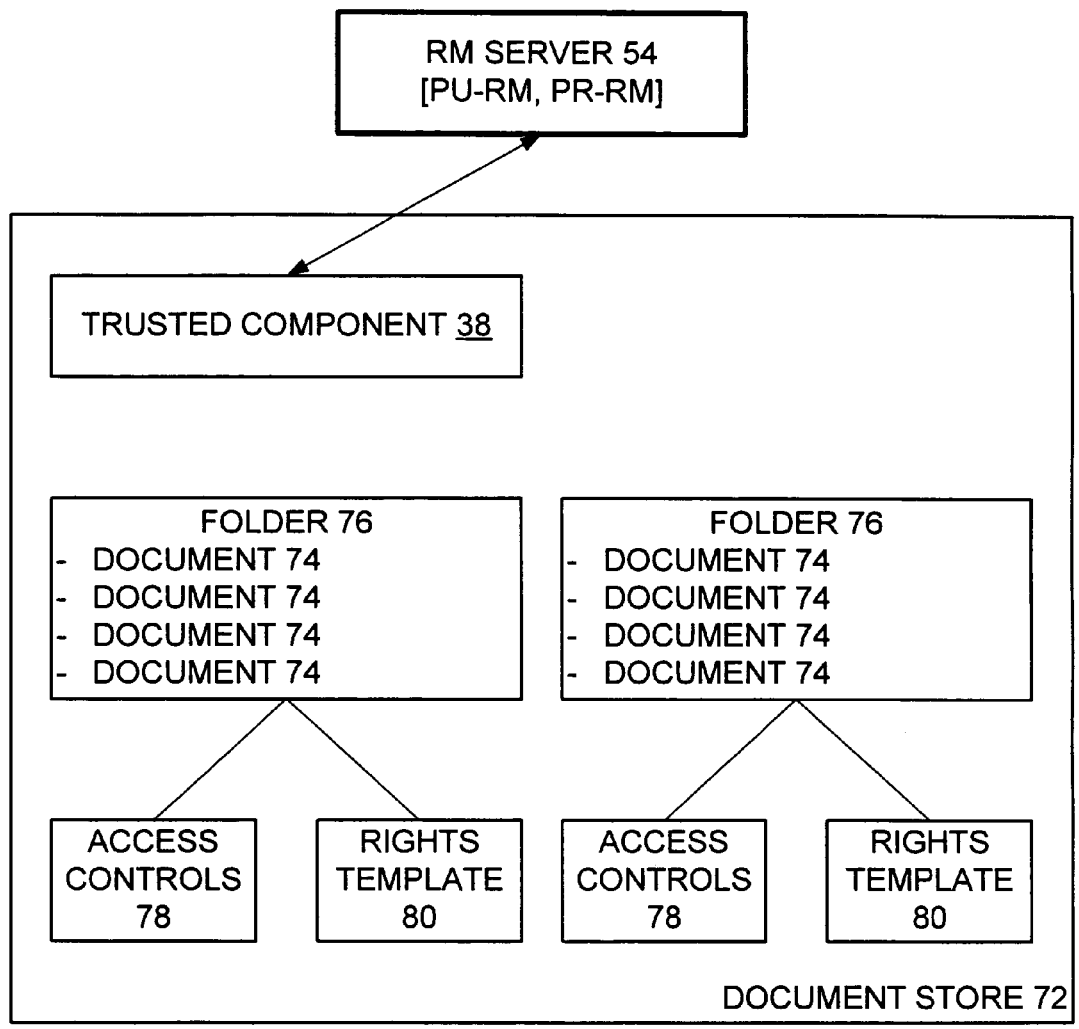
FIG. 12 is a block diagram showing the structure of a document store that dynamically applies RM protection to documents requested therefrom in accordance with one embodiment of the present invention.
Figure 16:
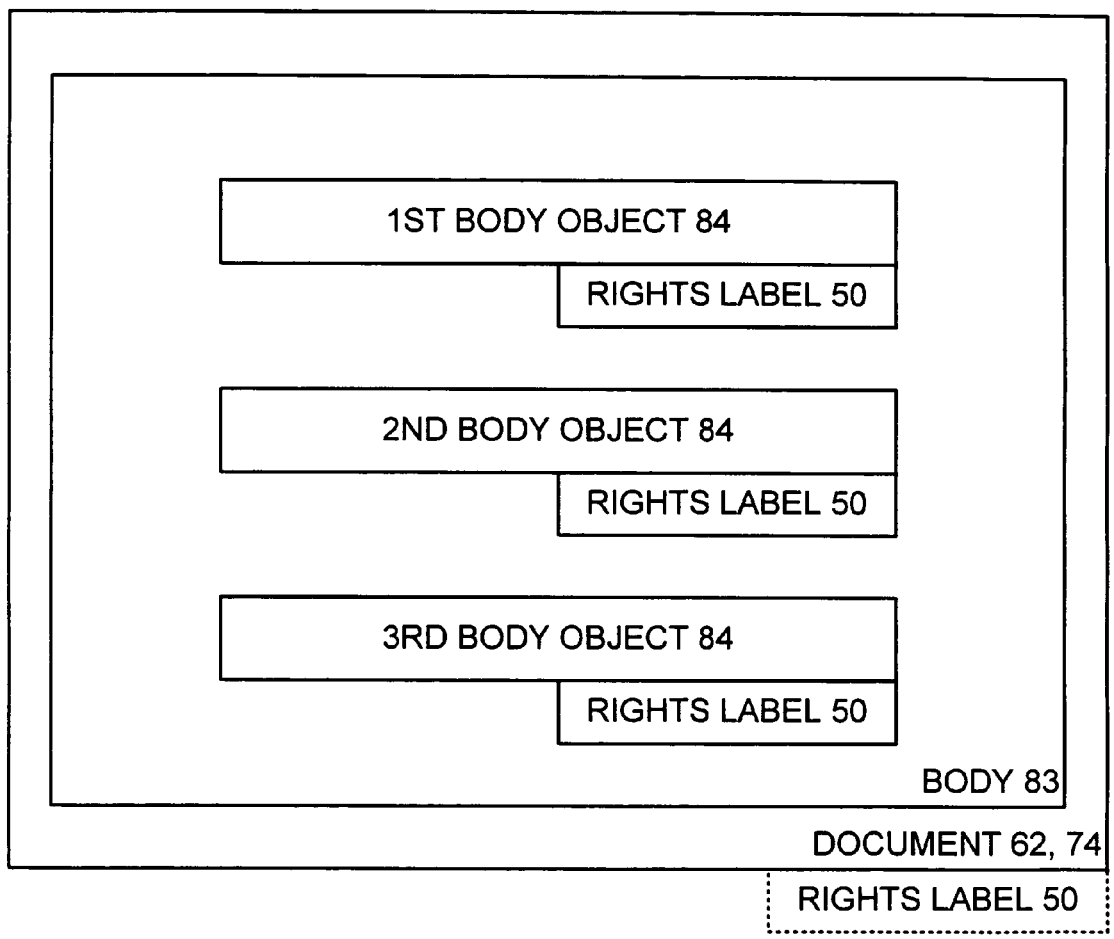
FIG. 16 is a block diagram showing a document with the RM-protected body objects of FIG. 15 therein in accordance with one embodiment of the present invention.

Significantly, although the use of a body object 84 has heretofore been described in terms of an email 44, such body object 84 may also be employed in connection with any type of document, including document 62 of FIG. 10, document 74 of FIG. 12, and the like, as is shown in FIG. 16. Thus, by using body objects 84 within the body 83 of a document 62, 74, the document 62, 74 may have RM protection, and parts of the document 62, 74 may have further RM protection. Alternatively, it may be the case that the document 62, 74 itself has no RM protection, but that various sensitive parts of the document 62, 74 have RM protection.

Note that at least some of the body objects 84 within an email 44, a document 62, 74, or otherwise, may share a common bind ID. Accordingly, and as should be appreciated, a license 36 for one of the bind ID sharing body objects 84 may also be employed for all other of the bind ID sharing body objects 84.

Decommissioning an RM Server 54

As should now be appreciated, in a typical RM protection scheme as thus far disclosed herein, protected content 32 is encrypted according to a cryptographic key, and the rights data 50 for the protected content 32 includes a decryption key (KD) for decrypting the encrypted content 32, where (KD) is encrypted according to a public key of an RM server 54 (PU-RM) operated by or on behalf of the organization to result in (PU-RM(KD)). Thus, only the RM server 54 having the private key (PR-RM) corresponding to (PU-RM) can apply same to (PU-RM(KD)) from the rights data 50 to obtain (KD), and then deliver (KD) in the form of a license 36 that is bound to the protected content 32.

A dilemma, arises, however in the situation where the RM server 54 with (PR-RM) is decommissioned, so that such RM server 54 no longer participates in creating and enforcing RM protection for protected content 32. As may be appreciated, reasons for decommissioning an RM server 54 are many and varied and can include a determination that the RM server 54 being decommissioned is obsolete or otherwise no longer worthy of participating in the RM protection scheme, a desire in general to no longer perform RM protection and enforcement, and the like.

At any rate, by decommissioning the RM server 54, all protected content 32 protected according to (PU-RM) for the decommissioned RM server 54 can no longer be licensed by such RM server 54. Without such license 36 and (KD) for the protected content 32 therein, and as should be appreciated, the protected content 32 can not ever be decrypted by (KD), even for an individual who would have rights to render the protected content 32 as determined by the rights data 50 therefor.

Figure 17:
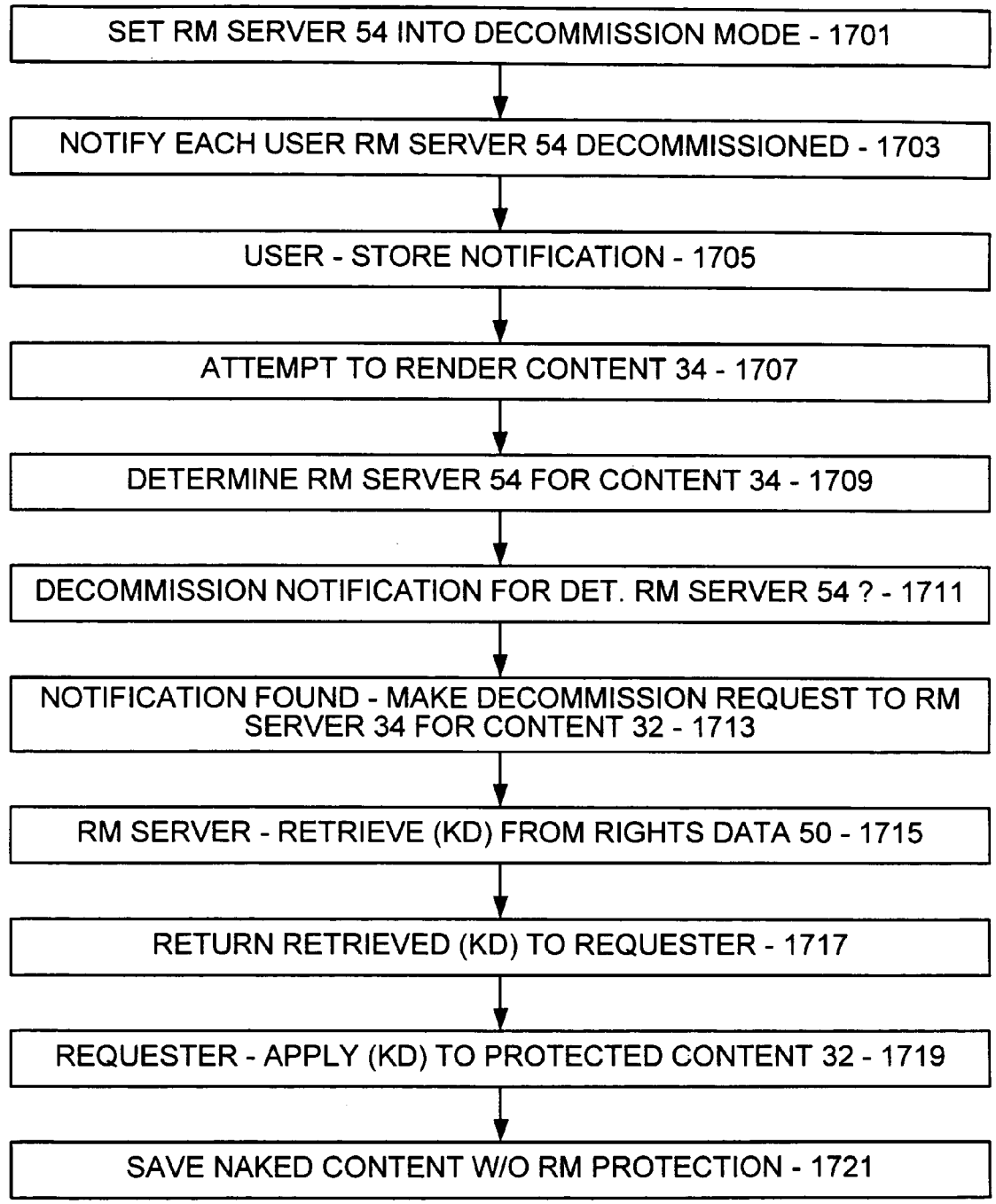
FIG. 17 is a flow diagram showing key steps performed in decommissioning the RM server of FIG. 3 and removing RM protection from corresponding protected content in accordance with one embodiment of the present invention.

Accordingly, in one embodiment of the present invention, when an RM server 54 is decommissioned, functionality is set into place to allow all content 32 protected according to the decommissioned RM server 54 to be permanently stripped of RM protection and to be saved in a decrypted or 'naked' state. In particular, and turning now to FIG. 17, a method of stripping the RM protection from a piece of protected content 32 based on the corresponding RM server 54 being decommissioned is shown.

Preliminarily, and as may be appreciated, the RM server 54 is in fact decommissioned by being set into a decommission mode (step 1701). Principally, in such decommission mode, the RM server 54 no longer issues a license 36 in response to a request therefor in connection with a piece of protected content 32. Instead, the RM server 54 issues a content key (KD) in response to a decommission request in connection with a piece of protected content 32. Moreover, inasmuch as (KD) is to be employed to permanently strip the protected content 32 of RM protection, such (KD) need not even be sent to the requester in a protected form.

At or about the time the RM server 54 is set into the decommission mode as at step 1701, each user is notified that the RM server 54 has been decommissioned (step 1703), and the user stores such notification in any appropriate location of the computing device 34 thereof (step 1705), such as for example a registry or other data store. Accordingly, each time the individual attempts to render a piece of content 34 (step 1707), the piece of content 34 is first examined to determine the RM server 54 that can issue a license 36 for such content 34 (step 1709), and the storage location of the computing device 34 is then checked for any decommission notification for the determined RM server 54 (step 1711). If no such decommission notification is found, the rendering process continues in a manner such as that shown in FIG. 9, where a license 36 that allows such rendering is obtained from an RM server 54 or is found on the computing device 34.

However, if the decommission notification for the determined RM server 34 is found, the trusted component 38 on the computing device 34 makes the aforementioned decommission request to the RM server 34 for the content 32 (step 1713). As may be appreciated, the decommission request is similar to a license request in that the RM server 36 is sent the rights data 50 corresponding to the protected content 32. Here, though, the RM server merely retrieves (KD) from the rights data 50 (step 1715) by applying (PR-RM) to (PU-RM(KD)) from the rights data 50, and returns the retrieved (KD) to the requester (step 1717). Again, such (KD) need not be protected, although such protection may be applied without departing from the spirit and scope of the present invention. Upon receiving (KD), the requester applies same to the protected content 32 to reveal the content in a naked form without any RM protection (step 1719), and then may save the content in the naked and non-protected form (step 1721).

Note that a nefarious user may cause a decommission request to be sent to a non-decommissioned RM server 54 in an attempt to obtain a (KD). However, the non-decommissioned RM server 54 should ignore such a decommission request because the non-decommissioned RM server 54 has not been set into decommission mode.

In an alternate embodiment of the present invention, the user need not be notified that the RM server 54 has been decommissioned as at step 1703. Instead, in response to a license request made to a decommissioned RM server 54, the RM server 54 merely retrieves and returns (KD)) as at steps 1715 and 1717. Of course, without such a notification, the user will continue to employ already-obtained licenses 36 from the decommissioned RM server 54.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the present invention, a rights management (RM) and enforcement architecture and method allow the controlled rendering of arbitrary forms of digital content, where such control is flexible and definable by the content owner/developer of such digital content. The architecture allows and facilitates such controlled rendering, especially in an office or organization environment or the like where documents are to be shared amongst a defined group of individuals or classes of individuals. Such architecture allows rights-managed email 44, propagating RM protection to attachments 52 of RM-protected email 44, acquiring decryption keys for RM-protected email 44, rights-managed documents 62, dynamic application of RM protection to a document 74 in a document store 72, RM-protected email conversations 82, decommissioning an RM server 54, and the like.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A system for an enabled recipient to handle a received rights-managed document having protected content from an author thereof, whereby the recipient can render the protected content with a corresponding license if the recipient satisfies terms set forth in the license, the system comprising:
   a rights management server computer; and
   the rights-managed document comprising:
      a storage portion having a message that the document is rights management protected; and
      a custom data portion having a section including the protected content and a section including rights data relating to the protected content, the rights data setting forth each entity that has rights with respect to the protected content, and for each such entity a description of such rights,
   wherein the rights data is forwarded to the rights management server computer, and the recipient if enabled by the rights data can render the protected content in the custom data portion and if not enabled by the rights data can only review the storage portion having the message,
   wherein the protected content in the custom data portion is encrypted according to a cryptographic key, the rights data including a decryption key for decrypting the encrypted content, the decryption key being encrypted according to a public key of the rights management server computer to result in an encrypted decryption key, the rights management server computer accessing the decryption key from the encrypted decryption key with a corresponding private key if the recipient is enabled by the rights data.

2. The document of claim 1 wherein the protected content in the custom data portion comprises multiple alternative forms of a body of the document, whereby the recipient can select from among the alternative forms when rendering the protected content.

3. The document of claim 1 wherein the protected content is compressed to reduce an overall size thereof.

4. The document of claim 1 comprising a word processing document.

5. The document of claim 1 wherein the custom data further has a section including an obtained license.

6. The document of claim 1 wherein the custom data further has a section including a transform specifying each section of custom data that is compressed and how the section is compressed.

7. A method for an enabled recipient to handle a received rights-managed document with protected content from an author, the method comprising:
   receiving the document comprising a storage portion having a message that the document is rights management protected and a custom data portion having a section including the protected content and a section including rights data relating to the protected content, the rights data setting forth each entity that has rights with respect to the protected content, and for each such entity a description of such rights;
   recognizing based on the storage portion that the document has the protected content in the custom data portion thereof, the protected content being encrypted and decryptable according to a decryption key, the decryption key being encrypted according to a public key of a rights management server to result in an encrypted decryption key that is stored in the custom data portion;
   retrieving the rights data in the custom data portion of the document;
   forwarding the retrieved rights data to the rights management server, such rights management server for determining that the recipient is an entity listed in the rights data and issuing to the recipient a license corresponding to the protected content to the recipient based on the rights data, such license specifying rights the recipient has with respect to the protected content as determined from the rights data and also including the decryption key from the rights data;
   reviewing the issued license to determine that the recipient has a right to render the protected content in the custom data portion of the document;
   retrieving the decryption key from the license; and
   rendering the decrypted content.

8. The method of claim 7 further comprising storing the issued license in a section of the custom data portion of the document.

9. The method of claim 7 wherein the protected content in the custom data portion comprises multiple alternative forms of a body of the document, the method further comprising selecting from among the alternative forms when rendering the protected content.

10. The method of claim 7 wherein the protected content in the custom data portion is compressed to reduce an overall size thereof, the method further comprising decompressing the protected content.

11. A tangible computer-readable storage medium having stored thereon a data structure comprising a rights-managed document having protected content from an author thereof, whereby a recipient of the document can render the protected content with a corresponding license if the recipient satisfies terms set forth in the license, the document comprising:
   a storage portion having a message that the document is rights management protected; and
   a custom data portion having a section including the protected content and a section including rights data relating to the protected content, the rights data setting forth each entity that has rights with respect to the protected content, and for each such entity a description of such rights,
   wherein the rights data is forwarded to a rights management server, and the recipient if enabled by the rights data can render the protected content in the custom data portion and if not enabled by the rights data can only review the storage portion having the message,
   wherein the protected content in the custom data portion is encrypted according to a cryptographic key, the rights data including a decryption key for decrypting the encrypted content, the decryption key being encrypted according to a public key of the rights management server to result in an encrypted decryption key, the rights management server accessing the decryption key from the encrypted decryption key with a corresponding private key if the recipient is enabled by the rights data.

12. The medium of claim 11 wherein the protected content in the custom data portion comprises multiple alternative forms of a body of the document, whereby the recipient can select from among the alternative forms when rendering the protected content.

13. The medium of claim 11 wherein the protected content is compressed to reduce an overall size thereof.

14. The medium of claim 11 wherein the document comprises a word processing document.

15. The medium of claim 11 wherein the custom data further has a section including an obtained license.

16. The medium of claim 11 wherein the custom data further has a section including a transform specifying each section of custom data that is compressed and how the section is compressed.

17. A tangible computer-readable storage medium having stored thereon computer-executable instructions for performing a method for an enabled recipient to handle a received rights-managed document with protected content from an author, the method comprising:

receiving the document comprising a storage portion having a message that the document is rights management protected and a custom data portion having a section including the protected content and a section including rights data relating to the protected content, the rights data setting forth each entity that has rights with respect to the protected content, and for each such entity a description of such rights;

recognizing based on the storage portion that the document has the protected content in the custom data portion thereof, the protected content being encrypted and decryptable according to a decryption key, the decryption key being encrypted according to a public key of a rights management server to result in an encrypted decryption key that is stored in the custom data portion;

retrieving the rights data in the custom data portion of the document;

forwarding the retrieved rights data to the rights management server, such rights management server for determining that the recipient is an entity listed in the rights data and issuing to the recipient a license corresponding to the protected content to the recipient based on the rights data, such license specifying rights the recipient has with respect to the protected content as determined from the rights data and also including the decryption key from the rights data;

reviewing the issued license to determine that the recipient has a right to render the protected content in the custom data portion of the document;

retrieving the decryption key from the license; and rendering the decrypted content.

18. The medium of claim 17 wherein the method further comprises storing the issued license in a section of the custom data portion of the document.

19. The medium of claim 17 wherein the protected content in the custom data portion comprises multiple alternative forms of a body of the document, the method further comprising selecting from among the alternative forms when rendering the protected content.

20. The medium of claim 17 wherein the protected content in the custom data portion is compressed to reduce an overall size thereof, the method further comprising decompressing the protected content.

* * * * *